United States Patent [19]
Eda et al.

[11] Patent Number: 6,044,723
[45] Date of Patent: Apr. 4, 2000

[54] ELECTRIC POWER ASSISTING STEERING APPARATUS

[75] Inventors: Hiroshi Eda, Maebashi; Yuji Kawaike, Gunma-ken; Masuji Machida, Maebashi, all of Japan

[73] Assignee: NSK Ltd., Tokyo, Japan

[21] Appl. No.: 09/066,571

[22] Filed: Apr. 27, 1998

[30] Foreign Application Priority Data

May 29, 1997 [JP] Japan ................................. 9-154301
Jul. 31, 1997 [JP] Japan ................................. 9-219036
Dec. 15, 1997 [JP] Japan ................................. 9-344583

[51] Int. Cl.$^7$ ............................. F16H 1/16; B62D 5/04; F16C 27/06
[52] U.S. Cl. ..................... 74/388 PS; 74/411; 74/425; 74/500; 180/443; 384/536
[58] Field of Search ........................ 74/388 PS, 411, 74/425, 50; 180/443, 444; 384/536

[56] References Cited

U.S. PATENT DOCUMENTS

| | | | |
|---|---|---|---|
| 2,473,267 | 6/1949 | Wightman | 384/536 |
| 2,698,131 | 12/1954 | Cook | 384/536 X |
| 2,803,507 | 8/1957 | Mempel et al. | 384/536 |
| 3,641,832 | 2/1972 | Shigeta et al. | 74/411 X |
| 4,696,587 | 9/1987 | Nishida et al. | 384/536 |
| 4,746,231 | 5/1988 | Hoshino | 384/536 X |
| 4,890,683 | 1/1990 | Matsuda et al. | 180/444 |
| 5,834,662 | 11/1998 | Stoll et al. | 74/425 |

FOREIGN PATENT DOCUMENTS

| | | |
|---|---|---|
| 197 52 075 | 5/1999 | Germany . |
| 6-16856 | 5/1994 | Japan . |
| 6-39665 | 5/1994 | Japan . |

*Primary Examiner*—Allan D. Herrmann
*Attorney, Agent, or Firm*—Vorys, Sater, Seymour and Pease LLP

[57] ABSTRACT

An electric power assisting steering apparatus comprises a housing, a motor mounted on the housing to generate auxiliary steering power in a rotating shaft, an output shaft to transmit the steering power for steering the wheels, a bearing for supporting the output shaft to be freely rotatable, and a worm gear mechanism having a worm connected to the rotating shaft and a worm wheel connected to the output shaft, to transmit the auxiliary steering power of the motor to the output shaft. An elastic body is provided between at least one of the rotating shaft and the housing and the bearing, so that when a tooth surface of the worm and that of the worm wheel are brought into contact with each other, the rotating shaft is moved in at least one of the axial direction and the radial direction relative to the housing by deforming the elastic body.

17 Claims, 20 Drawing Sheets

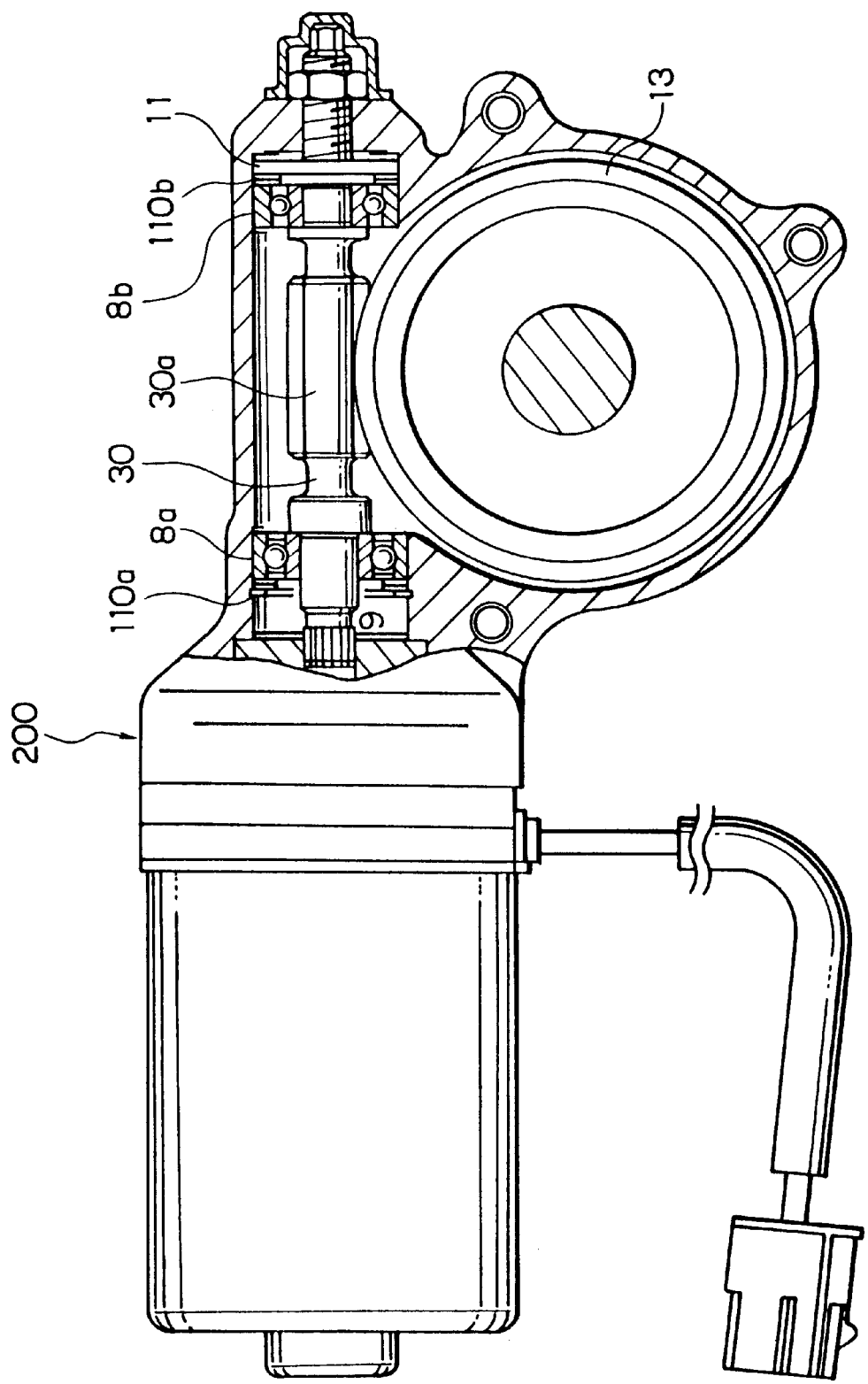

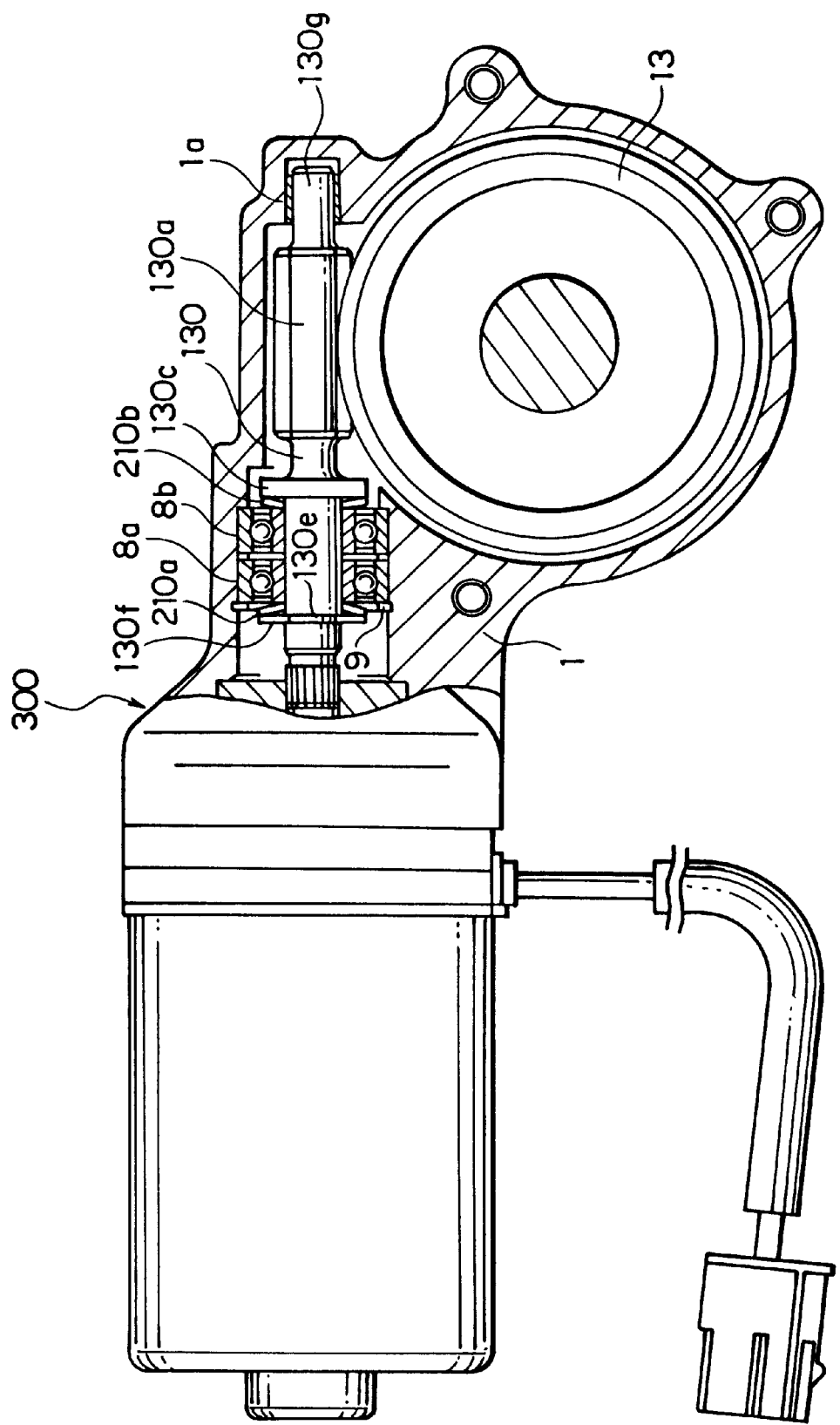

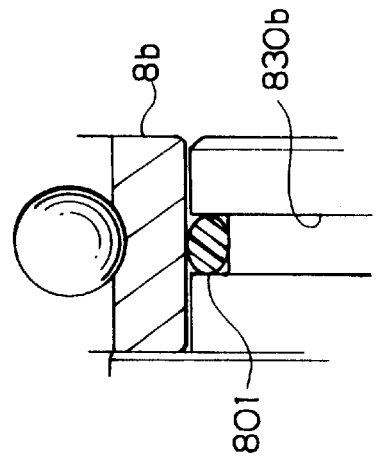
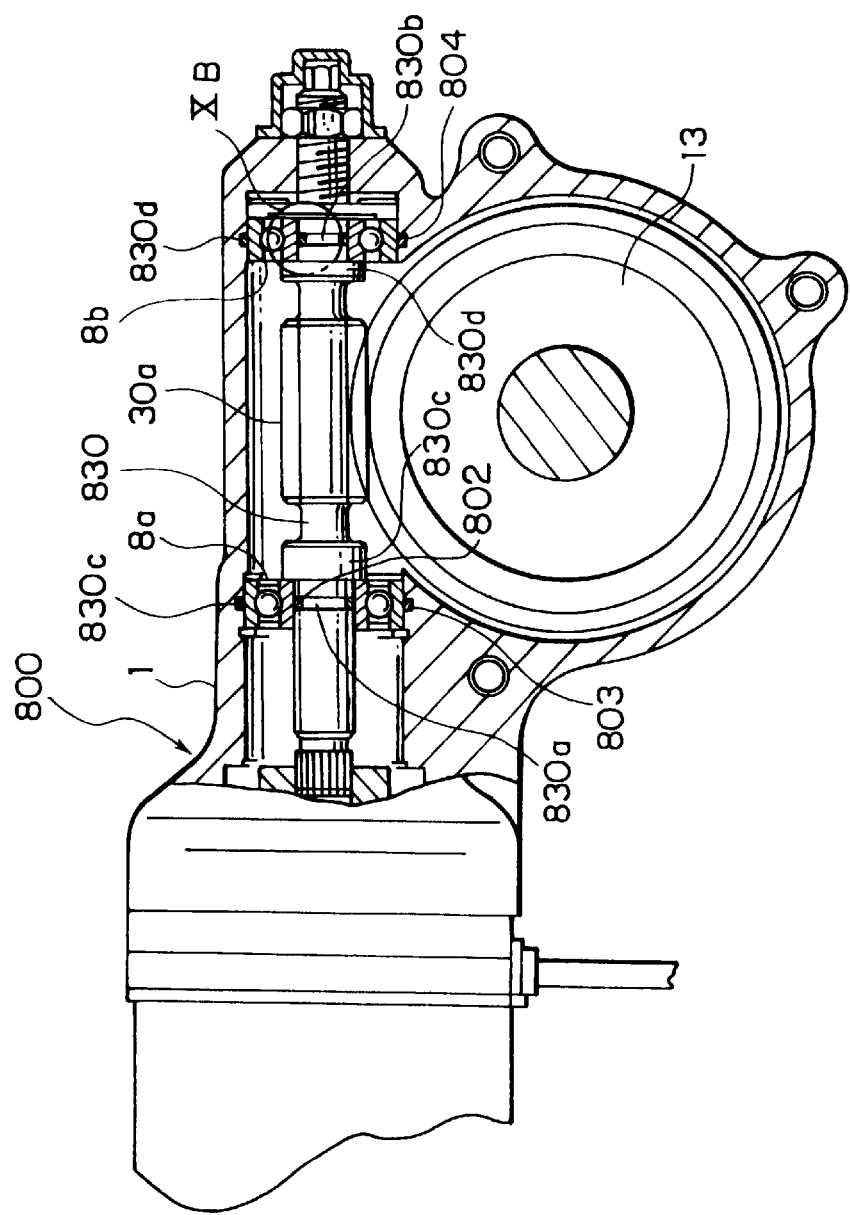

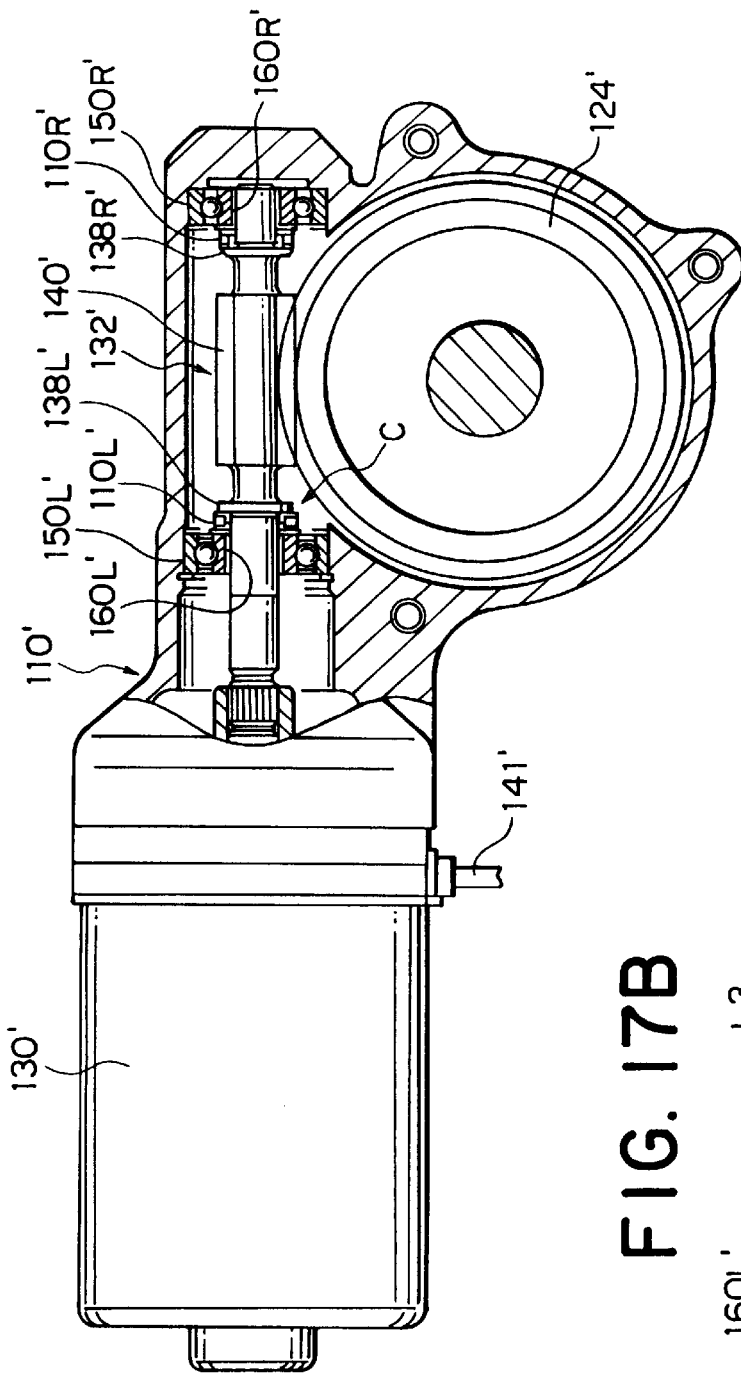
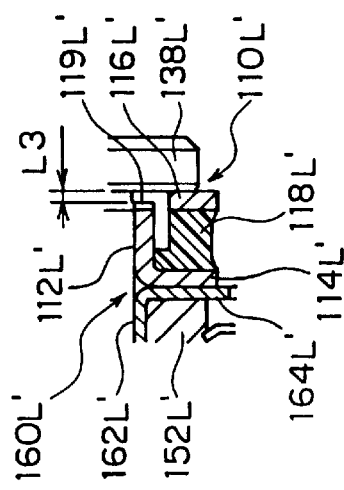

ELECTRIC POWER ASSISTING STEERING APPARATUS

This application claims the benefits of Japanese Application Nos. 9-154301, 9-219036 and 9-344583 which are hereby incorporated by reference.

BACKGROUND OF THE INVENTION

1. Field of the Invention

The present invention relates to an electric power assisting steering apparatus, and more particularly, to an electric power assisting steering apparatus which is capable of reducing a noise of a gear.

2. Related Background Art

As an electric power assisting steering apparatus for an automobile, there is known an apparatus which is arranged to decelerate a rotating output of an electric motor acting as an auxiliary steering torque by use of a gear device so as to transmit the decelerated output to an output shaft of a steering mechanism, and to thereby assist a steering effort applied on the steering wheel to steer the automobile. In such an electric power assisting steering apparatus, a power transmitting mechanism provided inside a housing is used to transmit the power to the output shaft, while decelerating the rotation of the electric motor.

In an electric power assisting steering apparatus using, for example, a worm gear mechanism as the power transmitting mechanism, it is necessary to set a proper backlash between the tooth surfaces of the worm and the worm wheel. That is, if such backlash is too small, teeth to mesh with each other tightly so as to make an operational torque heavy, which deteriorates the handle returning.

On the other hand, when the backlash is set to be large to some extent, tight meshing, etc., among the teeth is not caused. Moreover, even when the backlash is set large to some extent, no significant problems will occur if the motive power is transmitted in one direction in the worm gear mechanism. However, in the electric power assisting steering apparatus, the direction of transmission of the power can be changed depending on a steering operation of the steering wheel, a vibration from the road surface via the wheels, or the like.

If the direction of the power transmission is thus changed, a tooth surface on the back of a tooth surface which is so far in contact with a tooth surface of the other tooth suddenly moves by this backlash and collides with another tooth surface of the other tooth, thereby producing a relatively large beating sound. Such beating sound changes depending on the material and the rigidity of gears in mesh, and tends to be larger when the backlash is larger. Especially, when the gears in mesh are made of steel, the beating sound becomes a shock sound which is offensive and unpleasant to the driver.

Such beating sound can be reduced to some extent when one of the worm and the worm wheel is made of resin, but can not be deadened completely. Even in such case, muffled sound of a low frequency may remain.

If the backlash between the tooth surfaces of the worm and the worm wheel is set small, such beating sound can be reduced. However, with the small backlash, the processing accuracy for the worm and the worm wheel must be considerably enhanced so that the costs will be increased, apart from the above-mentioned problems.

SUMMARY OF THE INVENTION

Accordingly, taking the above problems into consideration, the object of the present invention is to provide an electric power assisting steering apparatus which can reduce a beating sound, though arranged in a simple structure.

In order to achieve the above object, an electric power assisting steering apparatus according to one aspect of the present invention comprises:

a housing;

a motor mounted on the housing to generate an auxiliary steering power in a rotating shaft;

an output shaft to transmit the steering power for steering the wheels;

a bearing for supporting the rotating shaft to be freely rotatable; and a gear mechanism having a first gear connected to the rotating shaft and a second gear connected to the output shaft to mesh with said first gear, to transmit the auxiliary steering power of the motor to the output shaft, wherein an elastic body is provided between at least one of the rotating shaft and the housing and the bearing, so that when a tooth surface of the worm and that of the worm wheel are brought into contact with each other, the rotating shaft is moved in at least one of the axial direction and the radial direction relative to the housing by deforming the elastic body.

According to the electric power assisting steering apparatus of the present invention, the arrangement is such that when the tooth surface of the worm and that of the worm wheel are brought into contact with each other, the rotating shaft is shifted in at least one direction of the axial direction and the radial direction relative to the housing by deforming the elastic body, so that a collision among the tooth surfaces can be eased to thereby reduce a beating sound of the tooth surfaces.

An electric power assisting steering apparatus according to another aspect of the present invention comprises:

a housing;

a motor mounted on the housing to generate an auxiliary steering power in a rotating shaft;

a bearing for supporting the output shaft to be freely rotatable; and an output shaft for transmitting the steering power to the wheels; and a gear mechanism having a first gear connected to the rotating shaft and a second gear connected to the output shaft to mesh with the first gear, to transmit the auxiliary steering power of the motor to the output shaft, wherein an elastic body is are interposed between the rotating shaft or the housing and the bearing, a bush is fitted in a portion of the bearing to slide and move with the rotating shaft or the housing, and when the tooth surface of the first gear and that of the second gear are brought into contact with each other, the rotating shaft is moved in the axial direction relative to the housing via the bush by deforming the elastic body.

In the electric power assisting steering apparatus according to the above second aspect of the present invention, the arrangement is such that when the tooth surface of the first gear and that of the second gear are brought into contact with each other, the rotating shaft is shifted in the axial direction relative to the housing via the bush while the elastic member is deformed, so that a collision among the tooth surfaces can be eased, to thereby reduce a beating sound of the tooth surfaces.

BRIEF DESCRIPTION OF THE DRAWINGS

FIG. 3 is a cross-sectional view similar to FIG. 2, showing an electric power assisting steering apparatus 200 according to a second embodiment of the present invention.

FIG. 4 is a cross-sectional view similar to FIG. 2, showing an electric power assisting steering apparatus 300 according to a third embodiment of the present invention.

FIGS. 5A to 5C are views showing an electric power assisting steering apparatus 400 according to a fourth embodiment of the present invention, in which FIG. 5A is a cross-sectional view of the power assisting steering apparatus 400 similar to FIG. 2, FIG. 5B is an enlarged view of the portion VB of FIG. 5A, and FIG. 5C is an enlarged view of the portion VC of FIG. 5A.

FIGS. 6A to 6C are views showing an electric power assisting steering apparatus 500 according to a fifth embodiment of the present invention, in which FIG. 6A is a cross-sectional view of the power assisting steering apparatus 500 similar to FIG. 2, FIG. 6B is an enlarged view of the portion VIB of FIG. 6A, and FIG. 6C is an enlarged view of the portion VIC of FIG. 6A.

FIGS. 8A to 8C are views for showing an electric power assisting steering apparatus 600 according to a sixth embodiment of the present invention, in which FIG. 8A is a cross-sectional view of the power assisting steering apparatus 600 similar to FIG. 2, FIG. 8B is an enlarged view of the portion VIIIB of FIG. 8A, and FIG. 8C is an enlarged view of the portion VIIIC of FIG. 8A.

FIGS. 9A to 9C are views showing an electric power assisting steering apparatus 700 according to a seventh embodiment of the present invention, in which FIG. 9A is a cross-sectional view of the power assisting steering apparatus 700 similar to FIG. 2, FIG. 9B is an enlarged view of the portion IXB of FIG. 9A, and FIG. 9C is an enlarged view of the portion IXC of FIG. 9A.

FIGS. 10A and 10B are views showing an electric power assisting steering apparatus 800 according to the eighth embodiment of the present invention, in which FIG. 10A is a cross-sectional view of the power assisting steering apparatus 800 similar to FIG. 2, and FIG. 10B is an enlarged view of the portion XB of FIG. 10A.

FIGS. 11A and 11B are views showing an electric power assisting steering apparatus 900 according to a ninth embodiment of the present invention, in which FIG. 11A is a cross-sectional view of the power assisting steering apparatus 900 similar to FIG. 2, and FIG. 11B is an enlarged view of the portion XIB of FIG. 11A.

FIGS. 13A and 13B are views showing an electric power assisting steering apparatus 1000 according to a tenth embodiment of the present invention, in which FIG. 13A is a cross-sectional view of the power assisting steering apparatus 1000 similar to FIG. 2, and FIG. 13B is an enlarged view of the portion XIIIB of FIG. 13A.

FIG. 17A is a front view (partial broken) showing a twelfth embodiment of the present invention.

FIG. 17B is an enlarged view of the portion C of FIG. 17A.

DESCRIPTION OF THE PREFERRED EMBODIMENTS

Embodiments of the present invention will be fully described below with reference to the attached drawings.

Figure 1:
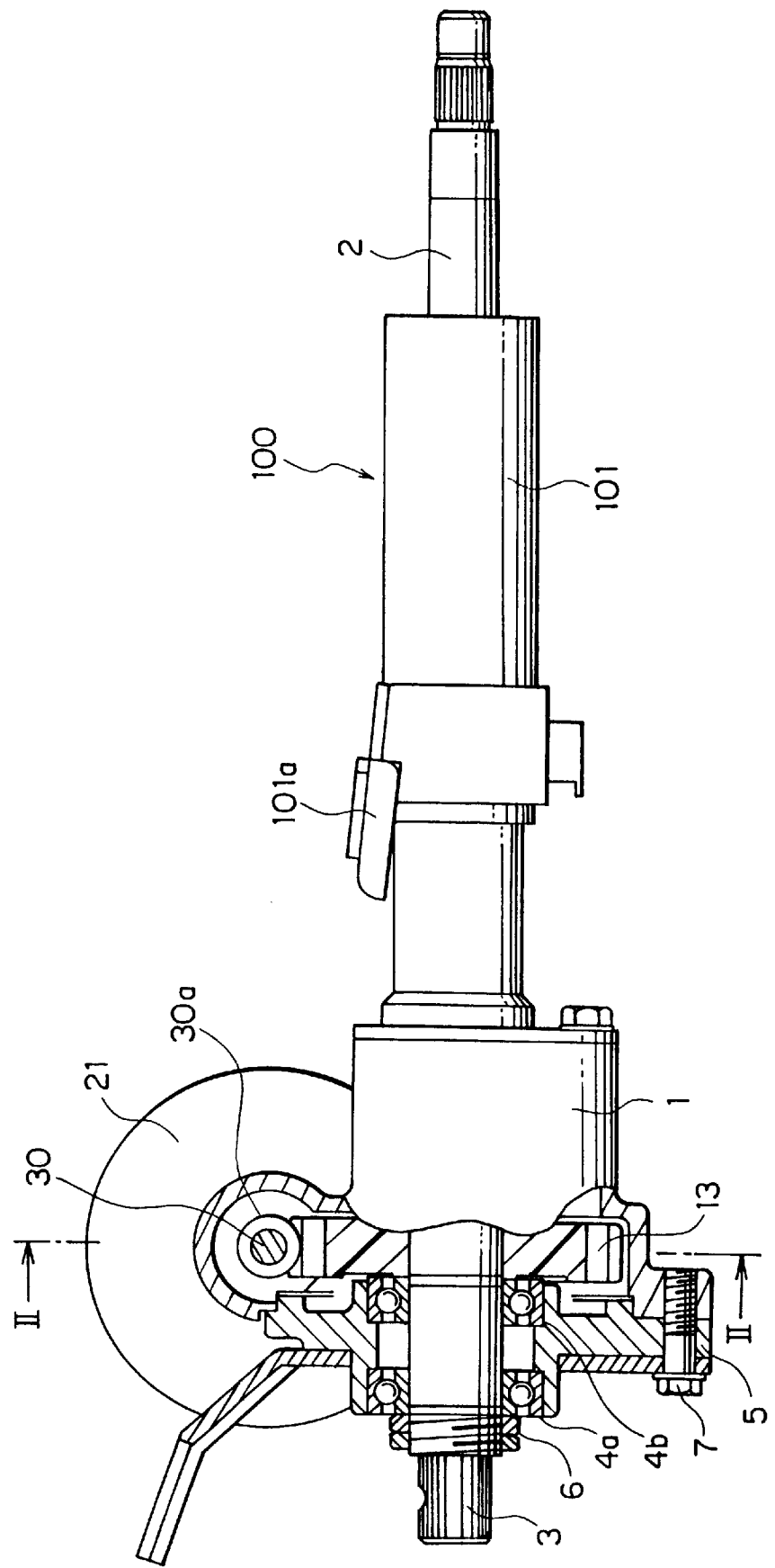
FIG. 1 is a partial cross-sectional view of an electric power assisting steering apparatus 100 according to a first embodiment of the present invention in the axial direction.

FIG. 1 is a partial cross-sectional view of an electric power assisting steering apparatus 100 according to the first embodiment of the present invention.

Referring to FIG. 1, the electric power assisting steering apparatus 100 comprises a tube 101 extended horizontally, and a housing 1 disposed at the left end of the tube 101. The tube 101 is fixed to a car body, which is not shown in the drawing, by a bracket 101a.

In the housing 1, an input shaft 2 which is connected to an unrepresented steering wheel is extended from the right and is connected to the right end (not shown) of an output shaft 3 via a unrepresented torsion bar in the tube 101. The left end of the output shaft 3 is connected to a steering mechanism which is not shown in the drawing. The center of the output shaft 3 is supported by two bearings 4a, 4b to allow free rotation. The outer races of the bearings 4a, 4b are supported by a bearing holder 5, and the bearing holder 5 is fixed to the housing 1 by a bolt 7. It should be noted that a lock nut 6 is threadably mounted on the output shaft 3 in order to press down or support the inner race of the bearing 4a.

A worm wheel 13 made of resin is fixed to the outer periphery of the output shaft 3 in the vicinity of the right end (not shown) thereof.

The worm wheel 13 is engaged with a worm 30a, and the worm 30a is formed on a rotating shaft 30 which is connected to a rotor 21a (FIG. 2) of an electric motor 21 fixed to the housing 1. This electric motor 21 is connected to an unrepresented CPU, and this CPU is used to receive an output of a torque sensor (not shown) or information on the car speed, etc., so as to supply a predetermined electric power to the electric motor 21 to produce a proper auxiliary or assisting torque.

Figure 2:
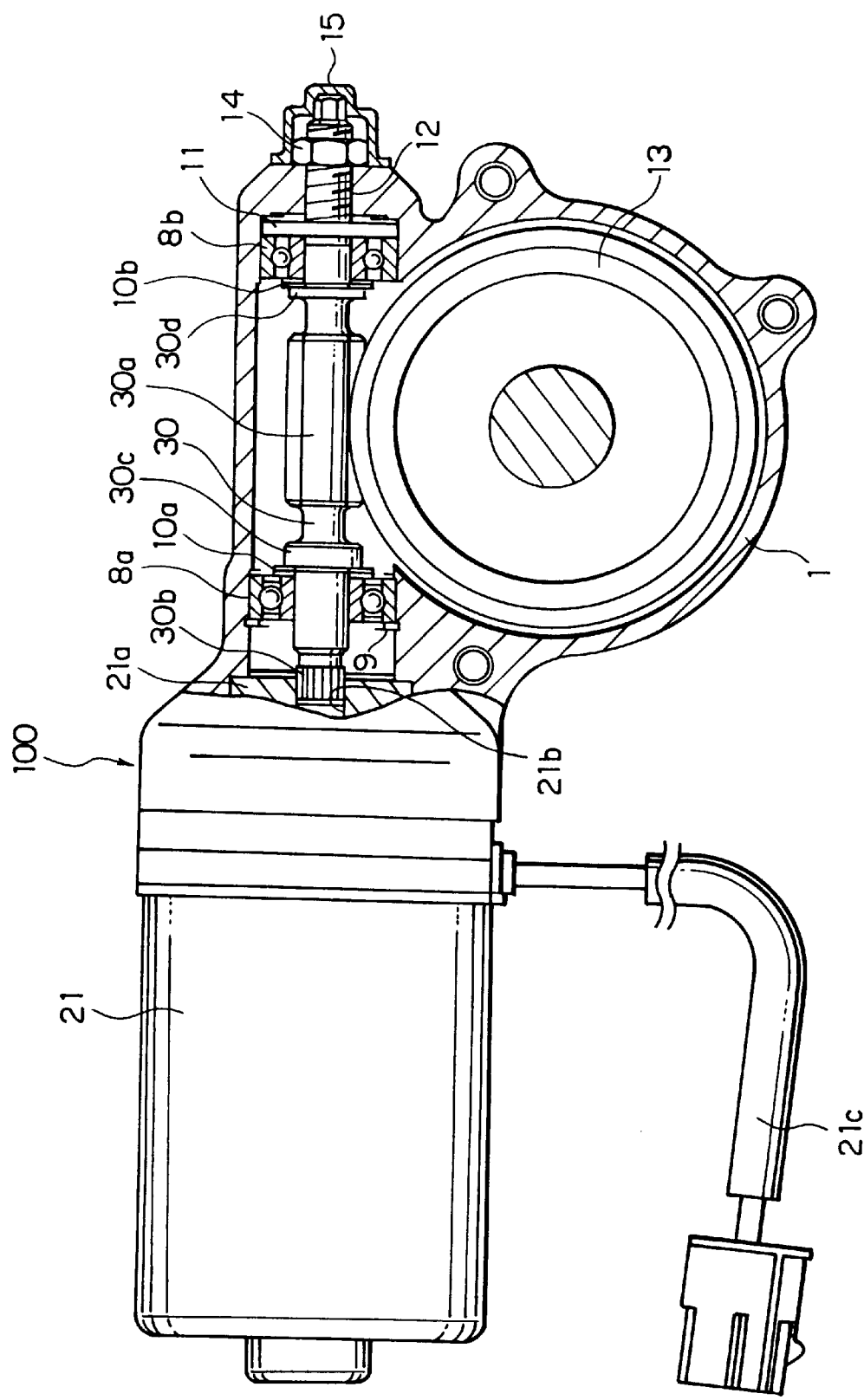
FIG. 2 is a cross-sectional view showing the electric power assisting steering apparatus of FIG. 1, cut-away along the line II—II.

FIG. 2 is a view of the electric power assisting steering apparatus 100 of FIG. 1, cut-away along the line II—II and seen in the direction of the arrow. Referring to FIG. 2, a serrated hole 21b is formed at the center of the rotor 21a of the electric motor 21 to which a driving power is supplied from an electric power supply line 21c. On the other hand, a serrated portion 30b is formed at the left end of the rotating shaft 30 which is disposed coaxially with the rotor 21a. By engaging the serrated portion 30b with the serrated hole 21b, it is possible for the rotating shaft 30 to move in the axial direction relatively to the rotor 21a, while the rotating shaft 30 rotates integrally with the rotor 21a.

The worm 30a is formed at the center of the rotating shaft 30. Moreover, flange portions 30c, 30d are formed on both sides of the worm 30a. In addition, a bearing 8a is disposed on the left of the left flange portion 30c, so as to support the rotating shaft 30 to allow free rotation relative to the housing 1. On the other hand, a bearing 8b is disposed on the right of the right flange portion 30d, so as to support in the same manner the right end of the rotating shaft 30 to allow free rotation relative to the housing 1.

The left side of the outer race of the bearing 8a is brought into contact with a stop ring 9 which is provided on the inner side of the housing 1. On the other hand, a pair of coned disc springs 10a which serve as an elastic body are disposed between the inner race of the bearing 8a and the flange portion 30c in such a manner that the peripheries thereof abut upon each other.

An annular pressing plate 11 is disposed on the right side of the bearing 8b, and the pressing plate 11 is pressed from the right by a bolt member 12 so that the periphery thereof is brought into contact with the outer race of the bearing 8b. A lock nut 14 is provided to prevent the bolt member 12 from being drawn out, and a cover member 15 is provided on the outer side of the lock nut 14. A pair of coned disc springs 10b which serve as an elastic body are disposed between the inner race of the bearing 8b and the flange portion 30d in such a manner that the outer peripheries thereof abut upon each other.

It should be noted that, since the coned disc springs are disposed as being flexed to some extent between the bearings 8a, 8b and the flange portions 30c, 30d, a predetermined pressure is given to the bearings 8a, 8b, whereby the rotating shaft 30 is supported to have no backlash in the axial direction. Moreover, in the case that a normal auxiliary or assisting steering power is transmitted from the worm 30a to the worm wheel 13, an amount of flex is set such that, though one of the coned disc springs is flexed and the rotating shaft 30 is moved to the maximum in one direction, the flex of the other of the coned disc springs remains.

Next, an operation of the present embodiment will be described below.

When the car is in a straight advance condition and no steering power is supplied to the input shaft 2 via the unrepresented steering wheel, the unrepresented torque sensor does not issue any output signal and, therefore, the electric motor 21 does not generate any auxiliary or assisting steering power.

If the driver handles the unrepresented steering wheel when the car is to make a turn at a curve, a torsion bar (not shown) is distorted so that a relative rotational movement is generated between the input shaft 2 and the output shaft 3 in accordance with the steering power. The torque sensor issues a signal to the CPU (not shown) in accordance with the direction and the amount of this relative rotational movement. Based on this signal, the electric motor 21 is controlled by the CPU and is rotated to generate the auxiliary steering power. Such rotation of the electric motor 21 is decelerated by the worm gear mechanism and transmitted to the output shaft 3.

Incidentally, there is a case in which the steering wheel is turned in one direction, and is immediately after turned in the reverse direction when the car is moved aside, or moved out of way. In such a case, the direction of the power transmission is rapidly reversed, and the tooth surface of the worm 30a and that of the worm wheel 13 which are usually separated away from each other to allow backlash collide with each other. There is also a case in which the tooth surfaces collide with each other due to a vibration sent from the wheels when the car is running. However, according to the present embodiment, an impact generated between those tooth surfaces is eased by further flexing the coned disc spring 10a or 10b and moving the rotating shaft 30 in the axial direction, whereby the beating sound can be reduced. It should be noted that the rotor 21a of the electric motor 21 and the output shaft 30 are connected to each other in a serrated manner so that the output shaft 30 can be moved relative to the rotor 21a in the axial direction.

Next, the second embodiment of the present invention will be described with reference to the attached drawings. FIG. 3 is a cross-sectional view, similar to FIG. 2, of an electric power assisting steering apparatus 200 according to the second embodiment of the present invention. It should be noted that this second embodiment will be described by focusing on different portions from the first embodiment shown in FIG. 2, and description of the common portions will be omitted.

The second embodiment shown in FIG. 3 is different from the first embodiment in the positions at which coned disc springs 100a, 110b are mounted. Specifically, in FIG. 3, the coned disc spring 110a is disposed between the stop ring 9 and the outer race of the bearing 8a. On the other hand, the coned disc spring 110b is disposed between the pressing plate 11 and the outer race of the bearing 8b.

Other structures and operations are the same as those of the first embodiment, so that description thereof will be omitted.

Next, the third embodiment of the present invention will be described with reference to the attached drawings. FIG. 4 is a cross-sectional view, similar to FIG. 2, of an electric power assisting steering apparatus 300 according to the third embodiment of the present invention. It should be noted that this third embodiment will be described by focusing on different portions from the first embodiment shown in FIG. 2, and description of the common portions will be omitted.

The third embodiment shown in FIG. 4 is different from the first embodiment in the manner of supporting of a rotating shaft 130. More specifically, in FIG. 4, the vicinity of the left end of the rotating shaft 130 is supported by the two bearings 8a, 8b which are disposed in series. The bearings 8a, 8b are mounted to be incapable of moving in the axial direction relative to the housing 1 by the stop ring 9. A flange portion 130c is formed to the right side of the bearings 8a, 8b, while an outer peripheral groove 130e is formed to the left side thereof.

A C-shaped clip 130f for forming the other flange portion is fitted in the outer peripheral groove 130e.

On the other hand, a slide bearing 1a is formed on the circumference of the right end 130g of the rotating shaft 130, so as to support the output shaft 130 to allow free rotation thereof and relative movement in the axial direction relative to the housing 1.

Referring to FIG. 4, one coned disc spring 210a is disposed between the clip 130f and the inner race of the bearing 8a, while another coned disc spring 210b is disposed between the flange portion 130c and the inner race of the bearing 8b. Other structures and operations are the same as those of the first embodiment, so that description thereof will be omitted. According to the present third embodiment, the surrounding structure of the slide bearing 1a can be made compact, compared with that of the foregoing embodiments, so that the freedom of designing of the surrounding of the electric power assisting steering apparatus 300 can be enhanced.

Figure 5A:
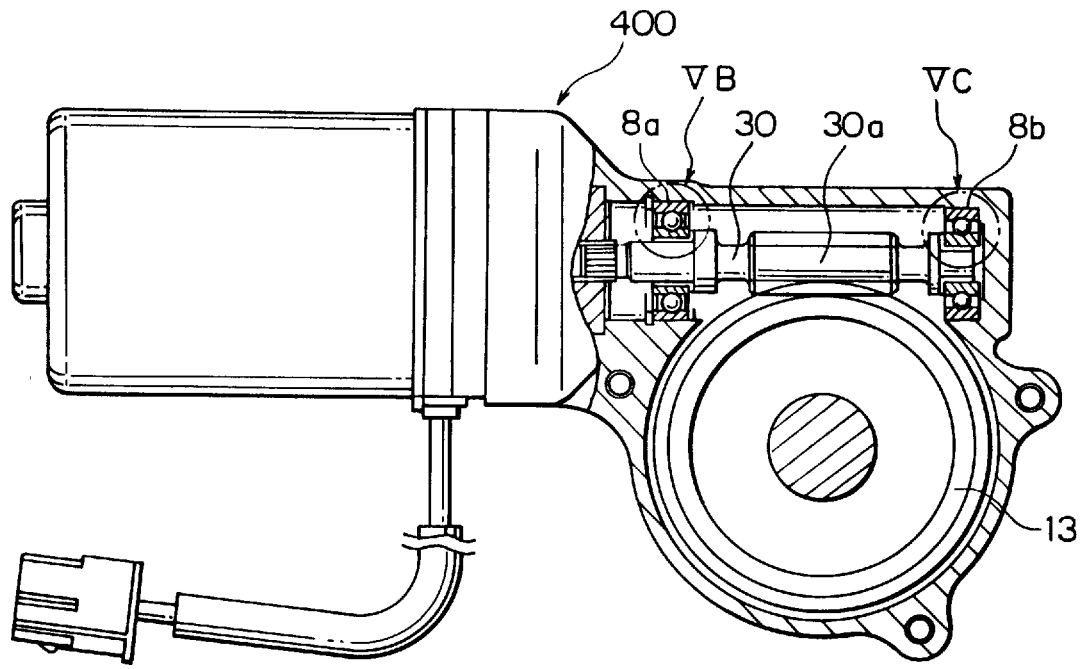
Figure 5B:
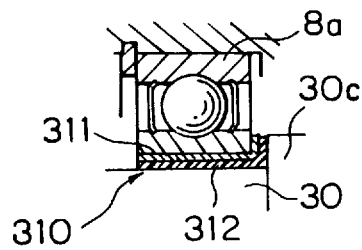
Figure 5C:
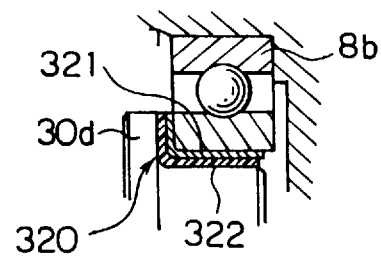

Next, the fourth embodiment of the present invention will be described with reference to the accompanying drawings. FIGS. 5A to 5C are views showing an electric power assisting steering apparatus 400 according to the fourth embodiment of the present invention. FIG. 5A is a cross-sectional view of the power assisting steering apparatus 400 similar to FIG. 2, FIG. 5B is an enlarged view of the portion VB of FIG. 5A, and FIG. 5C is an enlarged view of the portion VC of FIG. 5A. It should be noted that this fourth embodiment will be described by focusing on different portions from the first embodiment shown in FIG. 2, and description of the common portions will be omitted.

The fourth embodiment shown in FIGS. 5A to 5C is different from the first embodiment in the arrangement of elastic bodies. More specifically, bushes 310, 320 serving as the elastic bodies are respectively disposed between the inner peripheries of the bearing 8a and the bearing 8b and the outer periphery of the rotating shaft 30.

As shown in FIG. 5B and 5C, the bushes 310, 320 are formed by depositing rubber portions 312, 322 on metal cores 311, 321, which are made of flat plates each having a brim portion at an end of the cylindrical portion, over a range from the inner periphery to the brim portion thereof. The bushes 310, 320 are mounted in such a manner that the brim portion sides thereof are brought into contact with the flange portions 30c, 30d of the rotating shaft 30.

As described above, according to the present embodiment, even in the case where a tooth surface of the worm 30a and that of the worm wheel 13 are brought into contact with each other in a colliding manner, an impact generated between these tooth surfaces is eased by deforming the rubber portions 312, 322 of the bushes 310, 320 so as to slightly move the rotating shaft in the axial direction, whereby the beating sound can be reduced.

Figure 6A:
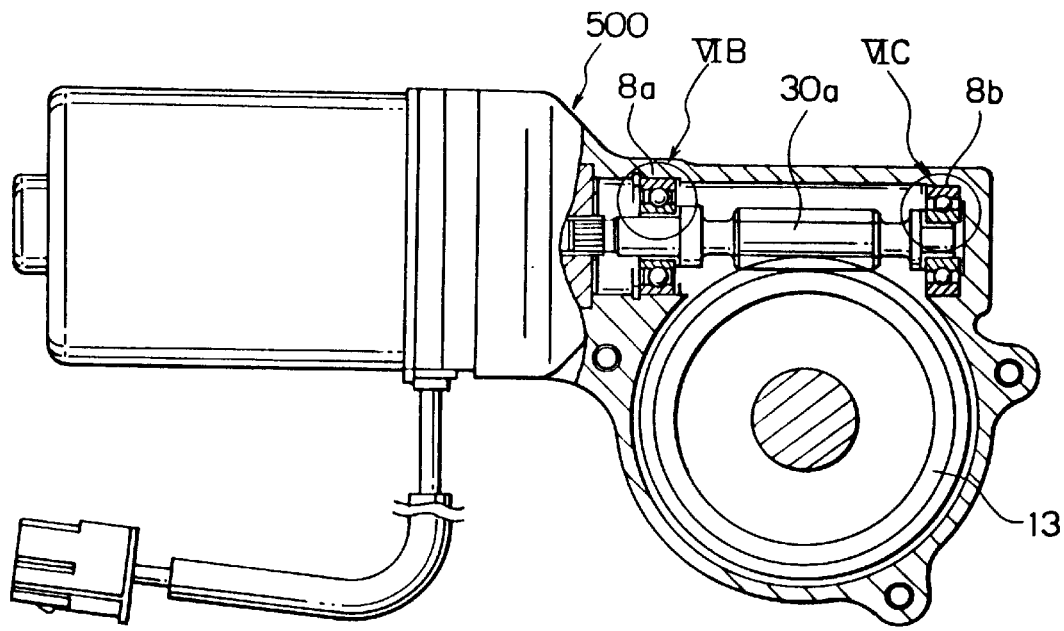
Figure 6B:
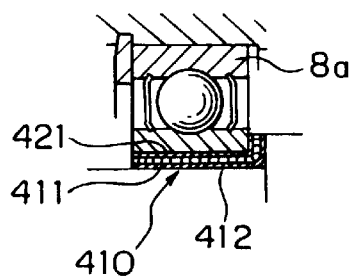
Figure 6C:
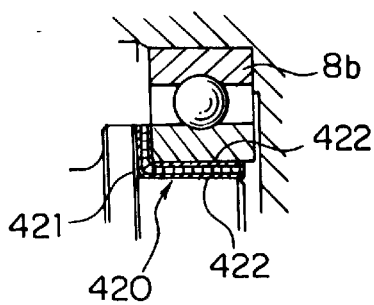
Figure 7:
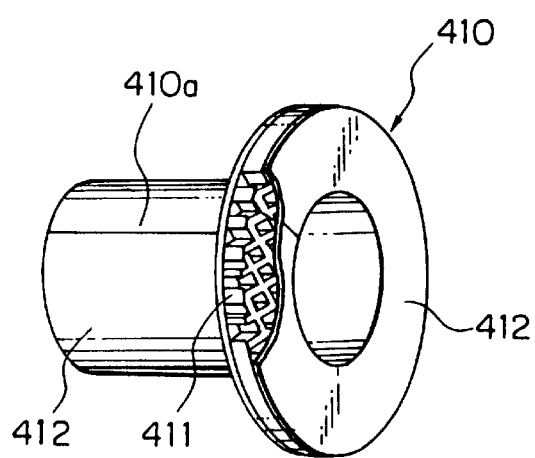
FIG. 7 is a perspective view of a bush of FIG. 6B.

Next, the fifth embodiment of the present invention will be described with reference to the accompanying drawings. FIGS. 6A to 6C are views showing an electric power assisting steering apparatus 500 according to the fifth embodiment of the present invention. FIG. 6A is a cross-sectional view of the power assisting steering apparatus 500 similar to FIG. 2, FIG. 6B is an enlarged view of the portion VIB of FIG. 6A, and FIG. 6C is an enlarged view of the portion VIC of FIG. 6A. FIG. 7 is a perspective view of a bush of FIG. 6 in which a part of the outer rubber portion thereof is cut away. It should be noted that this fifth embodiment will be described by focusing on different portions from the fourth embodiment shown in FIG. 5, and description of the common portions will be omitted.

The fifth embodiment shown in FIGS. 6A to 6C is different from the fourth embodiment in the arrangement of the bushes. More specifically, as shown in FIG. 7, a bush 410 is formed by depositing rubber 412 on a mesh-type core metal 411, which is made of a cylindrical metal having a brim portion at one end, over a range from the outer and inner peripheries to the brim portion thereof, that is, the entire surface of the core metal 411. The rubber 412 permeates into apertures of the mesh-type core metal 411 to be integrated with the mesh-type core metal 411, whereby the rigidity of the bush 410 is further enhanced.

A notch 410a is formed in the axial direction over the entire length of the bush 410. Since such bush 410a is formed, the diameter of the bush 410 can be easily extended, so as to be mounted on the rotating shaft 30 more easily. The arrangement of a bush 420 is the same as that of the bush 410, so description thereof will be omitted. The bushes 410, 420 are also mounted in such a manner that the brim portion sides thereof are brought into contact with the flange portions 30c, 30d of the rotating shaft 30. Other structures and operations are the same as those of the foregoing embodiments, so that description thereof will be omitted.

Figure 8A:
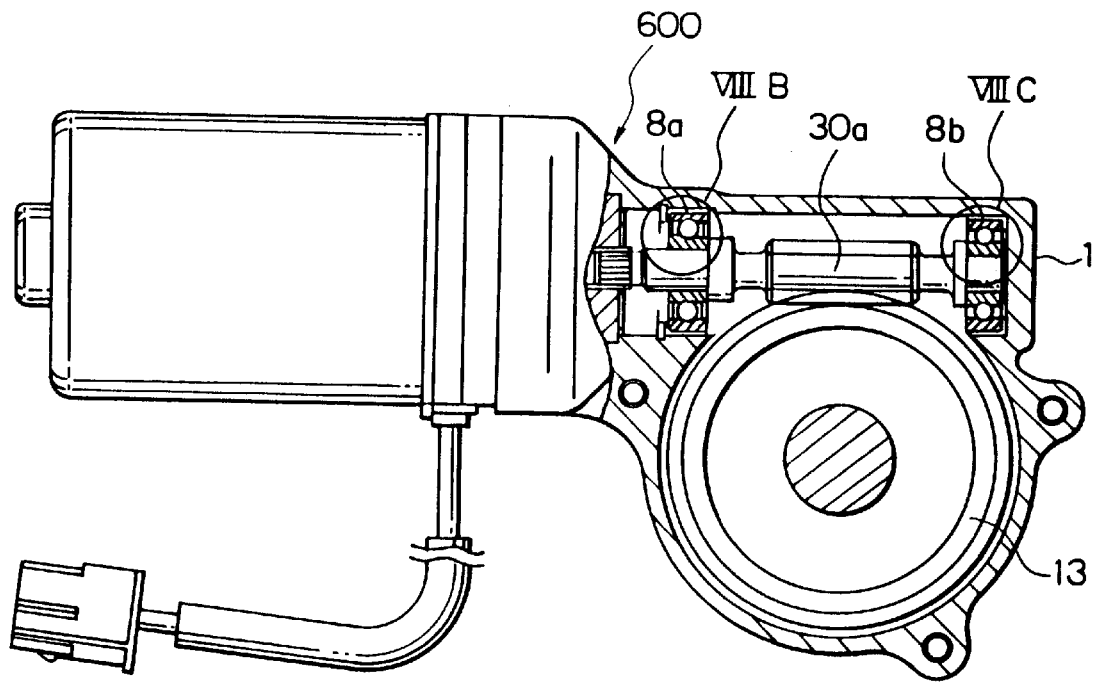
Figure 8B:
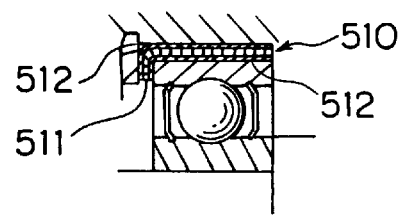
Figure 8C:
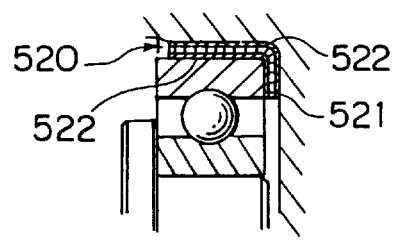

Next, the sixth embodiment of the present invention will be described with reference to the accompanying drawings. FIGS. 8A to 8C are views showing an electric power assisting steering apparatus 600 according to the sixth embodiment of the present invention. FIG. 8A is a cross-sectional view of the power assisting steering apparatus 600 similar to FIG. 2, FIG. 8B is an enlarged view of the portion VIIIB of FIG. 8A, and FIG. 8C is an enlarged view of the portion VIIIC of FIG. 8A. It should be noted that this sixth embodiment also will be described by focusing on different portions from the foregoing embodiments, and description of the common portions will be omitted.

The sixth embodiment shown in FIGS. 8A to 8C is different from the foregoing embodiments in the positions at which the bushes are disposed. More specifically, as shown in FIGS. 8B and 8C, bushes 510, 520 are disposed between the outer peripheries of the bearings 8a, 8b and the housing 1, respectively. It should be noted that the bushes 510, 520 are also formed by depositing rubber portions 512, 522 on the entire surfaces of mesh-type core metals 511, 521. Other structures and operations are the same as those of the foregoing embodiments, so that description thereof will be omitted.

The present invention has been explained above in connection with various embodiments thereof. However, the present invention should by no means be viewed as limited to these embodiments, and is intended to cover such modifications or changes as may come within the scope of the object of the invention. For example, the coned disc springs or the bushes have been used as elastic bodies. However, the arrangement is not limited to this. For example, the arrangement may be such that O-rings are directly mounted on the rotating shaft, or grooves for receiving O-rings are formed in end surface portions, in an outer diameter portion of a worm shaft, or in an inner diameter portion of the housing so that the O-rings are fitted in these grooves.

Figure 9A:
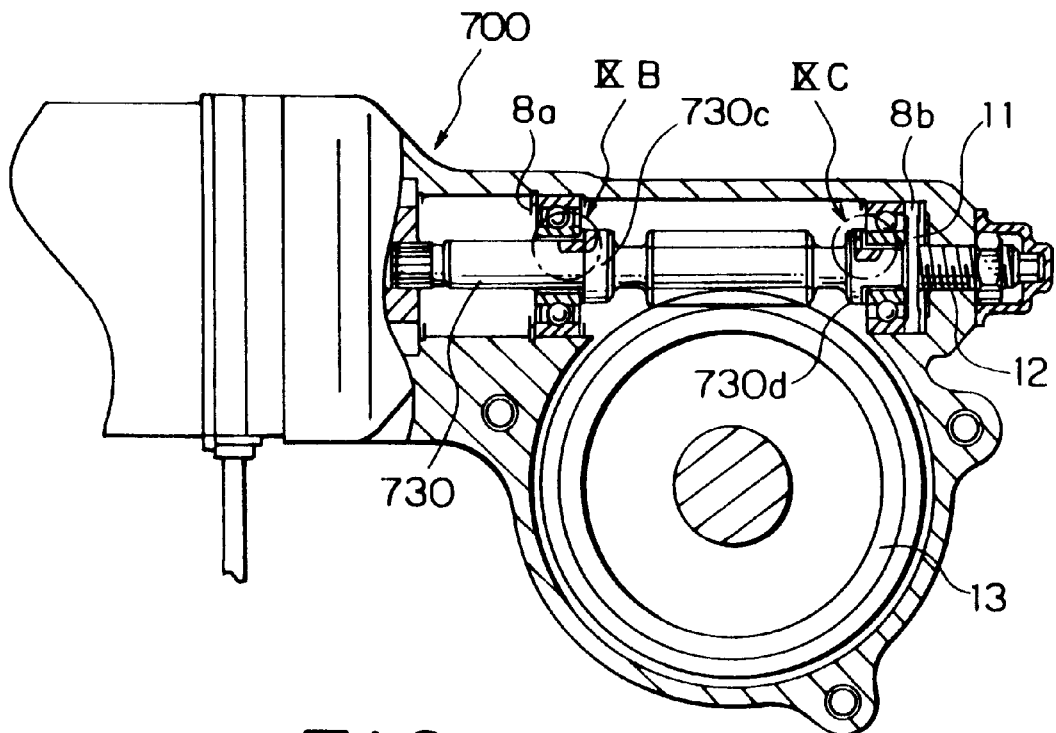
Figure 9B:
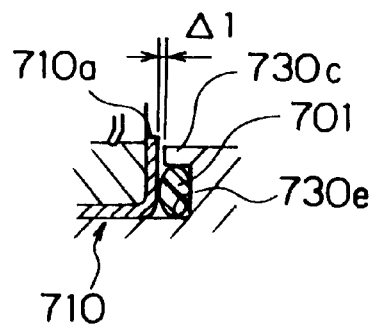
Figure 9C:
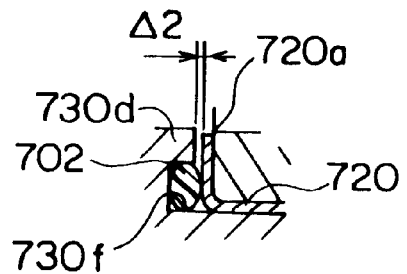

Such structure will be described more specifically with reference to the accompanying drawings. FIGS. 9A to 9C are views showing an electric power assisting steering apparatus 700 according to a seventh embodiment of the present invention. FIG. 9A is a cross-sectional view of the power assisting steering apparatus 700 similar to FIG. 2, FIG. 9B is an enlarged view of the portion IXB of FIG. 9A, and FIG. 9C is an enlarged view of the portion IXC of FIG. 9A. It should be noted this seventh embodiment also will be described by focusing on different portions from the foregoing embodiments, and description of the common portions will be omitted.

The seventh embodiment shown in FIGS. 9A to 9C is different from the foregoing embodiments in that O-rings serving as elastic bodies are disposed between the bushes and the rotating shaft. This arrangement will be described below more specifically. On a rotating shaft 730, peripheral grooves 730e, 730f are respectively formed at the root of a flange 730c to the right of bearing 8b and at the root of a flange 730d, to the left of bearing 8b as shown in FIGS. 9B and 9C.

An O-ring 701 is disposed in the peripheral groove 730e, while an O-ring 702 is disposed in the peripheral groove 730f. Bushes 710, 720 made of metallic material having a low frictional resistance are respectively disposed between the inner races of the bearings 8a, 8b and the rotating shaft 730.

The bushes 710, 720 have flange portions 710a, 720a which are opposite to the peripheral grooves 730e, 730f, and such flange portions 710a, 720a are sandwiched between the inner races of the bearings 8a, 8b and the O-rings 701, 702.

It should be noted that a gap Δ1 between the bush 710 and the flange 730c and a gap Δ2 between the bush 720 and the flange 730d are adjusted by pressing the bearing 8b with pressure from the bolt member 12 via the pressing plate 11.

According to this embodiment, an impact generated between the tooth surfaces of the worm gear can be eased by flexing the O-rings 701, 702 to move the rotating shaft 730 in the axial direction, whereby the beating sound can be reduced. It should be noted that the rotating shaft 730 is held by the bushes 710, 720 so as to easily move in the axial direction relative to the bearings 8a, 8b.

Next, the eighth embodiment of the present invention will be described with reference to the accompanying drawings. FIGS. 10A and 10B are views for showing an electric power assisting steering apparatus 800 according to the eighth embodiment of the present invention. FIG. 10A is a cross-sectional view of the power assisting steering apparatus 800 similar to FIG. 2, and FIG. 10B is an enlarged view of the portion XB of FIG. 10A. It should be noted that this eighth embodiment also will be described by focusing on different portions from the foregoing embodiments, and description of the common portions will be omitted.

The eighth embodiment shown in FIGS. 10A and 10B is different from the foregoing embodiments in the positions at which O-rings serving as elastic bodies are disposed. More specifically, as shown in FIG. 10A, peripheral grooves 830a, 830b are formed opposite the inner races of the bearings 8a, 8b on a rotating shaft 830. On the other hand, peripheral grooves 830c, 830d are formed opposite the outer races of the bearings 8a, 8b in the housing 1. Moreover, an O-ring 801 is disposed in the peripheral groove 830b, an O-ring 802 in the peripheral groove 830a, an O-ring 803 in the peripheral groove 830c, and an O-ring 804 in the peripheral groove 830d.

According to this embodiment, an impact generated between tooth surfaces of the worm gear can be eased by flexing the O-rings 801, 802, 803, 804 to move the rotating shaft 830 in a direction perpendicular to the axial line (the direction away from the worm wheel 13), so the beating sound can be reduced. Also according to this embodiment, since the rotating shaft 830 is held to have a high rigidity in the axial direction, such effect can be obtained that the position at which the worm 30a and the worm wheel 13 mesh with each other is not changed. It should be noted that such effect can be satisfactorily obtained if either one of the O-rings 801, 802 of the rotating shaft 830 or the O-rings 803, 804 of the housing 1 is provided.

Incidentally, the tooth beating sound of the worm gear which is generated by a vibration or the like sent from the wheels can be reduced more effectively if the rigidity of the elastic bodies is small since a load supplied to the worm shaft is small. In this case, an amount of displacement of the worm in the axial direction can be also small.

On the other hand, since a load supplied from the motor side is comparatively large, an amount of displacement of the worm in the axial direction is large if the rigidity of the elastic bodies is small. If such amount of displacement becomes large, an amount of friction between the worm shaft and the bearings increases so that friction in a spline portion connected to the motor increases Moreover, even when the motor is rotated, necessary rotation is not transmitted to the worm wheel if the worm escapes in the axial direction, which may result in delay in the performance of control response. The following embodiments are intended to solve such problem.

Figure 11A:
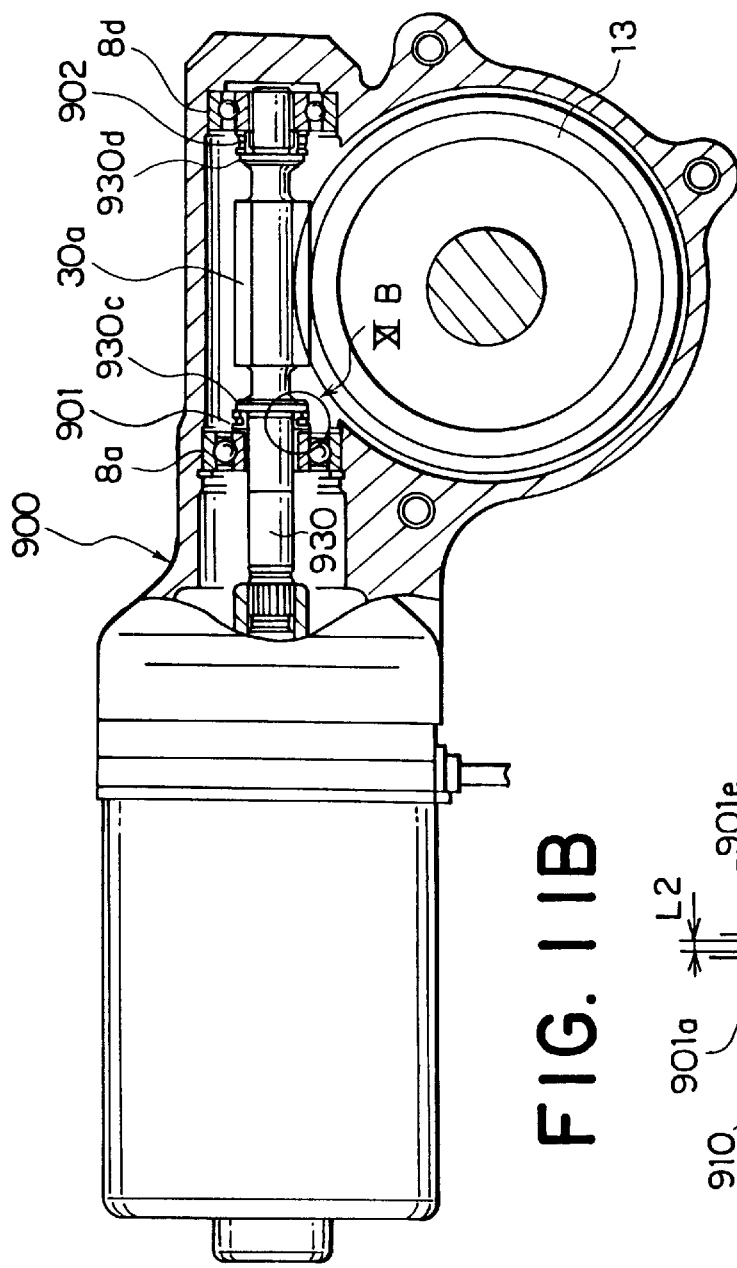
Figure 11B:
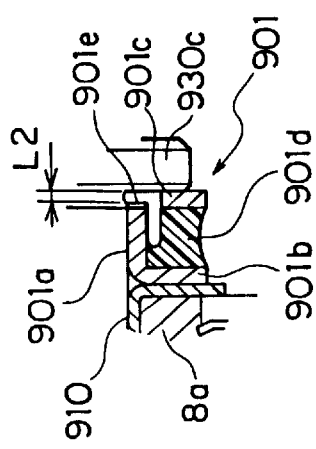

FIGS. 11A and 11B are views showing an electric power assisting steering apparatus 900 according to the ninth embodiment of the present invention. FIG. 11A is a cross-sectional view of the power assisting steering apparatus 900 similar to FIG. 2, and FIG. 11B is an enlarged view of the portion XIB of FIG. 11A. It should be noted that this ninth embodiment will also be described by focusing on different portions from the foregoing embodiments, and description of the common portions will be omitted.

The ninth embodiment is different from the foregoing embodiments (for example, the embodiment shown in FIG. 9) in the arrangement of the elastic bodies. More specifically, according to the embodiment shown in FIGS. 11A and 11B, elastic members are interposed to serve as the elastic bodies between the bearing 8a and a flange 930c of a rotating shaft 930 and between the bearing 8b and a flange 930d. It should be noted that the elastic members 901, 902 are identical to each other, but disposed in opposite directions, so that only the elastic member 901 will be fully described and description of the elastic member 902 will be omitted.

As shown in FIG. 11B, the elastic member 901 has a cylindrical member 901a which is fitted on the outer periphery of the rotating shaft 930 and a disc member 901c which is not a part of the cylindrical member 901a. Moreover, the cylindrical member 901a has a flange 901b which is contacted with a bush 910, and the flange 901b and the disc member 901c are connected to each other by an elastic portion 901d. A part of the elastic portion 901d is extended thinly along the inner surface of the cylindrical member 901a in the axial direction, so as to form a thin portion 901e which has a small thickness in the axial direction at the end portion of the cylindrical member 901a.

It should be noted that the elastic member 901 in its assembled state brings the disc portion 901c into contact with the flange 930c of the rotating shaft 930 and the flange 901b of the cylindrical member 901a into contact with the bearing 8a via the bush 910, so that the elastic portion 901d is given a predetermined preload by pressing the bearing 8a and the flange 930c toward each other. In the assembled state, the flange 930c and the thin portion 901e are separated away from each other only by a distance L2. Such assembled state is the same with respect to the elastic member 902.

Figure 12:
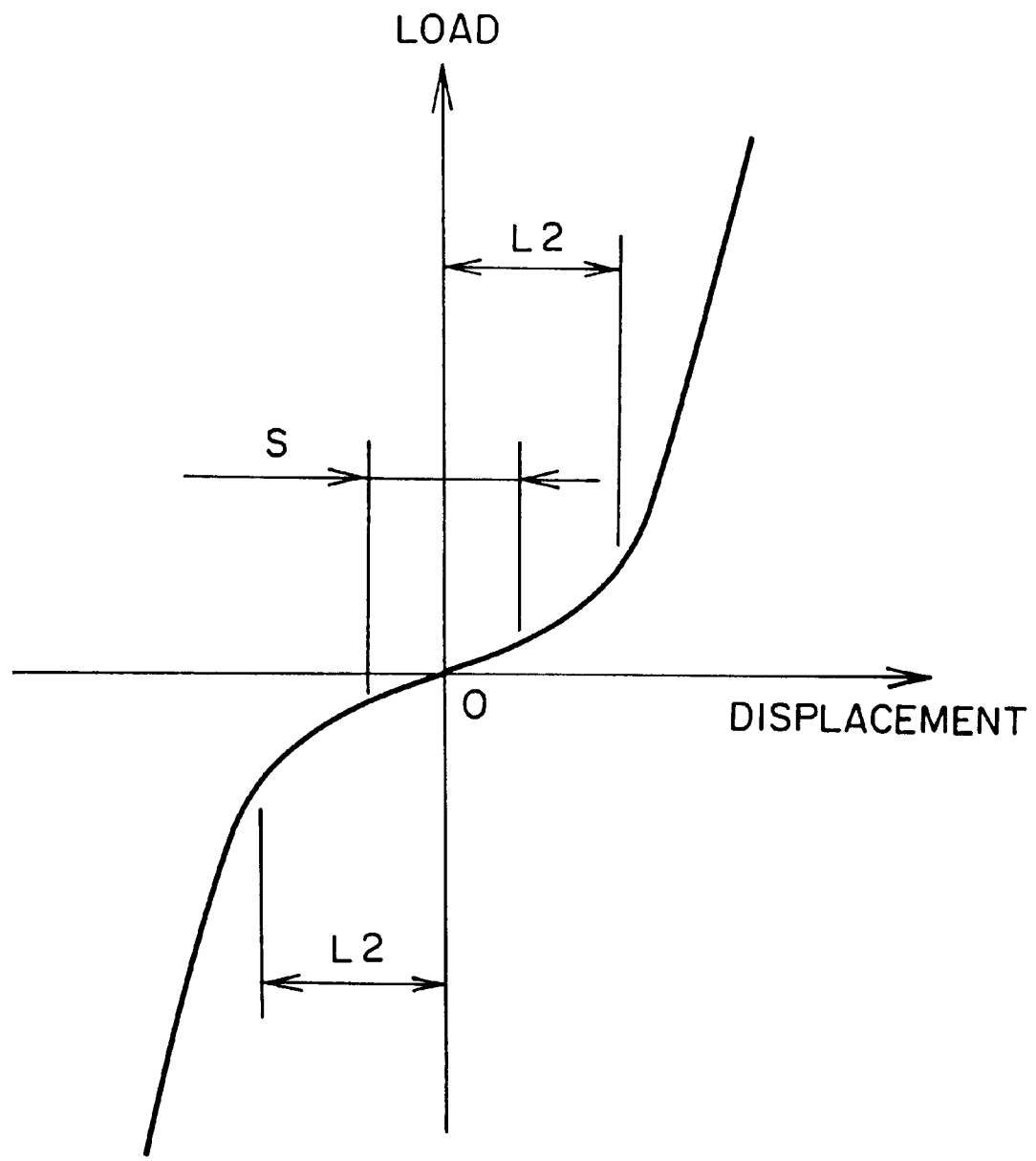
FIG. 12 is a characteristic view showing an amount of displacement when elastic members 901, 902 are incorporated in a rotating shaft 930 to give a load in the axial direction.

FIG. 12 is a characteristic view showing an amount of displacement in the case that the elastic members 901, 902 are incorporated in the rotating shaft 930 to be given a load in the axial direction. Referring to FIG. 12, when the amount of displacement and the load are negative, the rotating shaft 930 is given a leftward force to be displaced leftward. When the amount of displacement and the load are positive, the rotating shaft is given a rightward force to be displaced rightward. For convenience of the description, the rotating shaft 930 is to be displaced leftward.

As clearly seen from the drawing, when the amount of displacement exceeds the value L2, the load rapidly rises. The reason for this is, though only the elastic portion 901*d* of the elastic member 901 is arranged to be elastically deformed until the amount of displacement reaches the value L2, the thin portion 901*e* is brought into contact with the flange 930*c* when the amount of displacement exceeds the value L2, whereby a load for a unit amount of displacement substantially increases. That is, the elastic members 901, 902 have two levels of elastic coefficients.

In the present embodiment, since the load supplied to the rotating shaft 930 due to a vibration or the like sent from the unrepresented wheels is comparatively small, the rotating shaft 930 is displaced in the axial direction only within a range of the area S shown in FIG. 12. Consequently, under such conditions, the thin portion 901*e* of the elastic member 901 (902) is not brought into contact with the flange 930*c*, so that the rigidity of the elastic member 901 is small and the effect of reducing the gear beating sound is large.

On the other hand, if the load supplied from the motor side is large and the amount of displacement of the rotating shaft 930 exceeds the value L2, the thin portion 901*e* is brought into contact with the flange 930*c* in order to suppress further displacement of the rotating shaft 930. Consequently, it becomes possible to suppress amounts of friction between the worm shaft and the bearings or friction of the spline portion connected to the motor by suppressing the displacement of the rotating shaft 930. It is also possible to prevent the worm from escaping in the axial direction so as to enhance the performance of control response.

Figure 13:
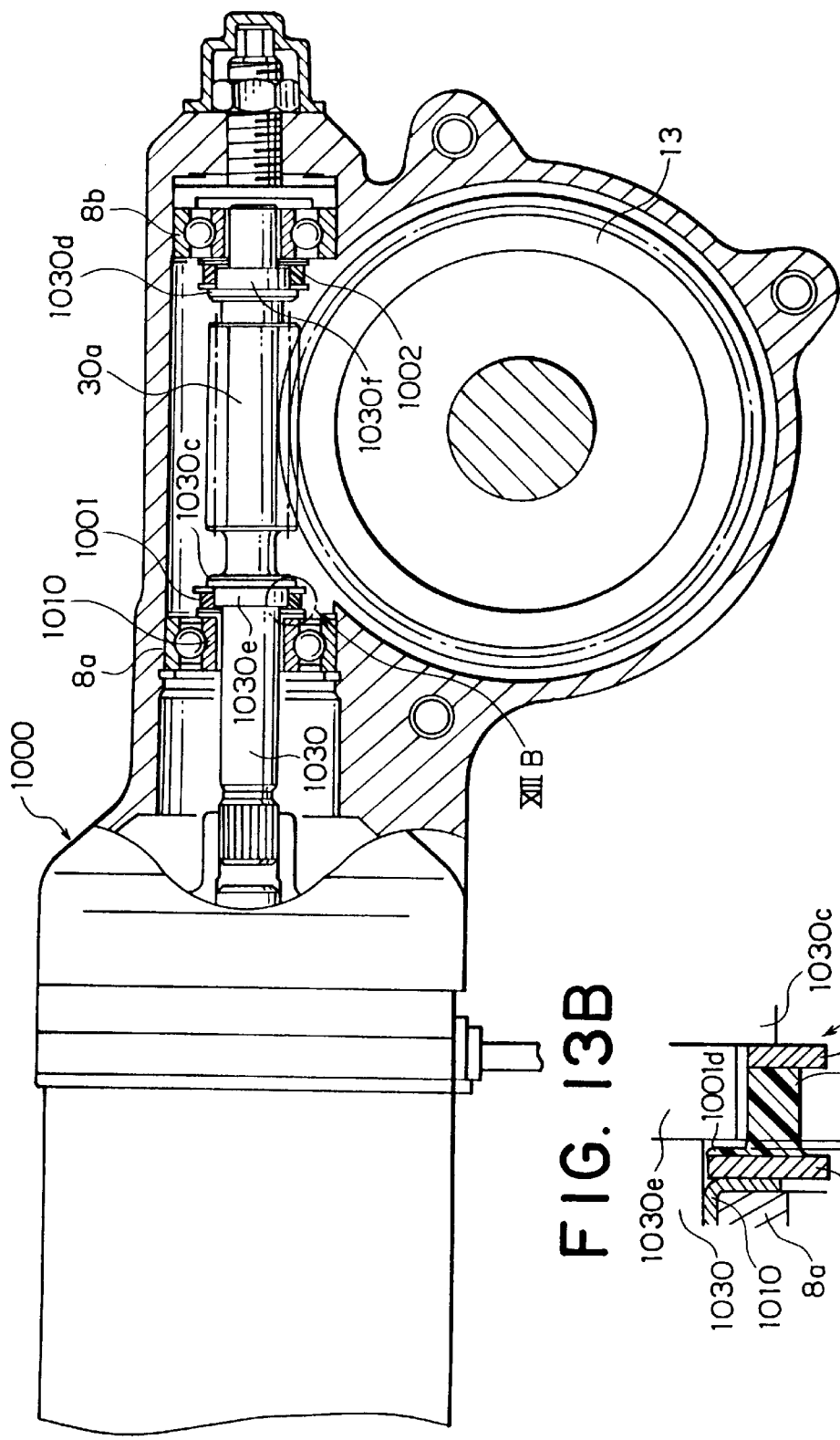

FIGS. 13A and 13B are views for showing an electric power assisting steering apparatus 1000 according to the tenth embodiment of the present invention. FIG. 13A is a cross-sectional view of the power assisting steering apparatus 1000 similar to FIG. 2, and FIG. 13B is an enlarged view of the portion XIIIB of FIG. 13A. It should be noted that this tenth embodiment will also be described by focusing on different portions from the foregoing embodiments, and description of the common portions will be omitted.

The tenth embodiment is different from the ninth embodiment in the arrangement of the elastic bodies. More specifically, as shown in FIGS. 13A and 13B, according to the tenth embodiment, in the same manner as in the ninth embodiment, elastic members 1001, 1002 are interposed between the bearing 8*a* and a flange 1030*c* of a rotating shaft 1030 and between the bearing 8*b* and a flange 1030*d* to serve as the elastic bodies. However, this a arrangement is different from that in the ninth embodiment as described below. It should be noted that the elastic members 1001, 1002 are identical to each other, but disposed in opposite directions, so that only the elastic member 1001 will be fully described and description of the elastic member 1002 will be omitted.

As shown in FIG. 13A, the rotating shaft 1030 is arranged adjacent to the flange portion 1030*c* so as to form a large diameter portion 1030*e*, and is arranged adjacent to the flange portion 1030*e* so as to form a large diameter portion 1030*f*.

Referring to FIG. 13B, the elastic member 1001 has a small-diameter hole disc portion 1001*a* which is disposed on the outer periphery of the rotating shaft 1030, and a large-diameter hole disc portion 1001*b* which is disposed on the outer periphery of the large diameter portion 1030*e*. The both disc portions 1001*a* and 1001*b* are connected to each other by an elastic portion 100*c*. A part of the elastic portion 1001*c* is extended thinly along the side surface of the small-diameter hole disc portion 1001*a* in the axial direction, so as to form a thin portion 1001*d* having a small thickness between the small-diameter hole disc portion 1001*a* and the large diameter portion 1030*e*.

It should be noted that the elastic member 1001 in its assembled state brings the large-diameter disc portion 1001*b* into contact with the flange 1030*c* of the rotating shaft 1030 and the small-diameter disc portion 1001*a* into contact with the bearing 8*a* via a bush 1010, so so that the elastic portion 1001*c* is given a predetermined preload by pressing the bearing 8*a* and the flange 1030*c* toward each other. In the assembled state, the flange 1030*c* and the thin portion 1001*d* are separated away from each other only by a distance L3. Such assembled state is the same with respect to the elastic member 1002.

In the same manner as in the ninth embodiment, though only the elastic portion 1001*c* of the elastic member 1001 is arranged to be elastically deformed until the amount of displacement of the rotating shaft 1030 reaches the value L3, the thin portion 1001*d* is brought into contact with the large diameter portion 1030*e* when the amount of displacement exceeds the value L, whereby a load for a unit amount of displacement drastically increases. That is, the elastic members 1001, 1002 also have two levels of elastic coefficients.

According to the present embodiment, since the load supplied to the rotating shaft 1030 due to a vibration or the like sent from the unrepresented wheels is comparatively small, the thin portion 1001*d* of the elastic member 1001 (1002) is not brought into contact with the large diameter portion 1030*e* under such conditions, so that the rigidity of the elastic member 1001 is small and the effect of reducing the gear beating sound is large.

On the other hand, if the load supplied from the motor side is large and the amount of displacement of the rotating shaft 1030 exceeds the value L3, the thin portion 1001*d* is brought into contact with the large diameter portion 1030*e* in order to suppress further displacement of the rotating shaft 1030. Consequently, it becomes possible to suppress amounts of friction between the worm shaft and the bearings or friction of the spline portion connected to the motor by suppressing the displacement of the rotating shaft 1030. It is also possible to prevent the worm from escaping in the axial direction so as to enhance the performance of control response.

In addition, according to the present embodiment, as shown in FIG. 13B, a hole provided in the small-diameter hole disc portion 1001*a* of the elastic member 1001 (1002) has a diameter smaller than the outer diameter of the large diameter portion 1030*e*, so that it is impossible to incorporate this elastic member into the outer periphery of the large diameter portion 1030*e* of the rotating shaft 1030. Consequently, according to such arrangement, a so-called erroneous assembly can be prevented in which the assembling directions of the elastic members 1001, 1002 are mistaken so that the elastic members 1001, 1002 are provided on the outer periphery of the rotating shaft 1030 as a result.

According to the embodiments described above, since the arrangement is such that, when the tooth surface of the worm and that of the worm wheel are brought into contact with each other, the rotating shaft is moved at least in one direction out of the axial direction or the radial direction relative to the housing by deforming the elastic members, the impact among the tooth surfaces can be eased and the beating sound of the tooth surfaces can be reduced. Also according to such arrangement, an extent of the unevenness to which the backlash is allowed is relaxed, and the manufacturing control on the processing accuracy, selection of gears to be combined, or the like, becomes easier, whereby the costs can be reduced.

Figure 14:
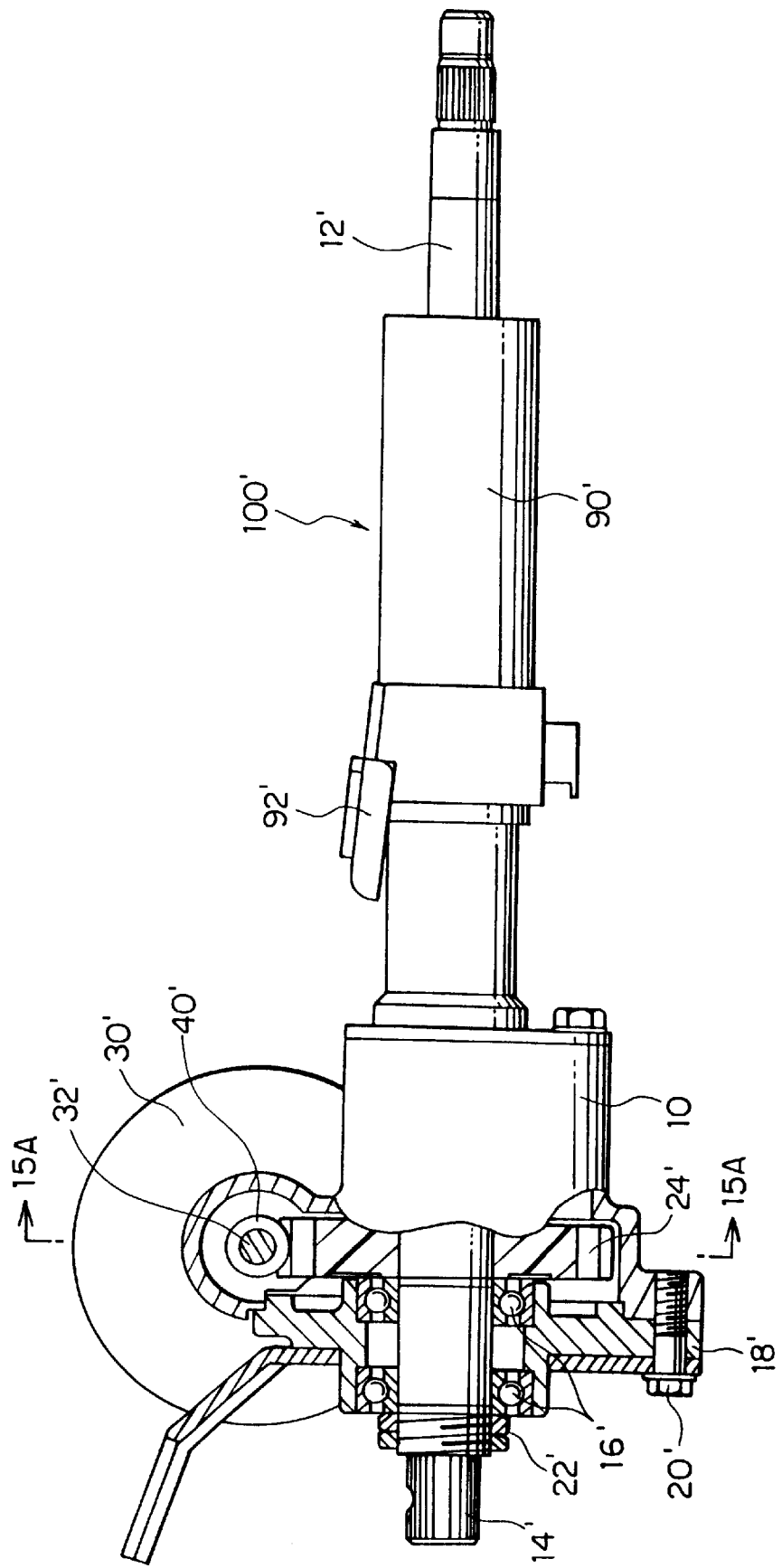
FIG. 14 is a general view (partial broken) showing an entire electric power assisting steering apparatus according to an eleventh embodiment of the present invention.
Figure 15A:
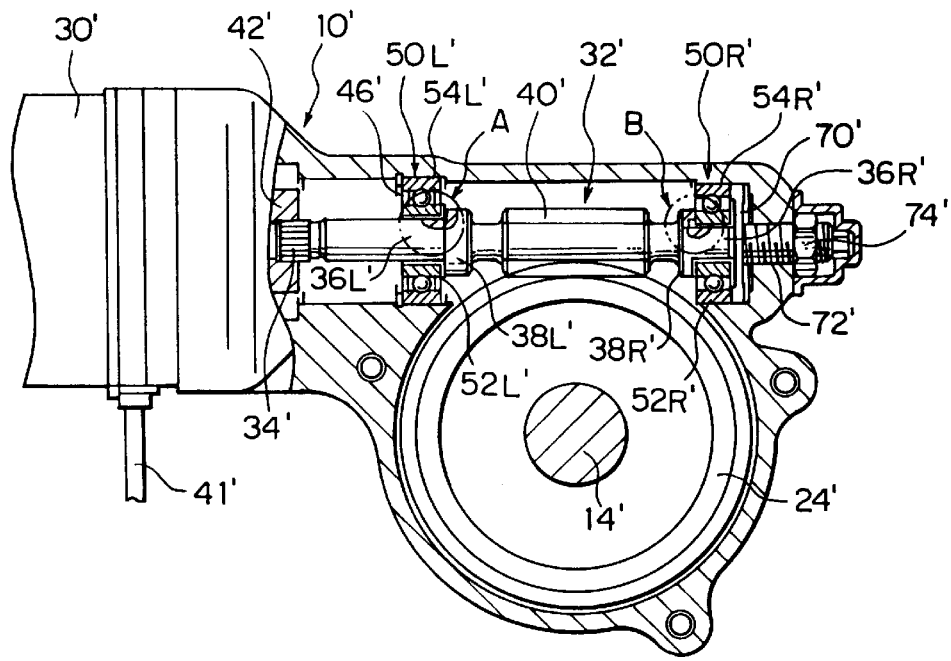
FIG. 15A is a cross-sectional view showing the eleventh embodiment of the present invention, taken along 15A—15A in FIG. 14.
Figure 15B:
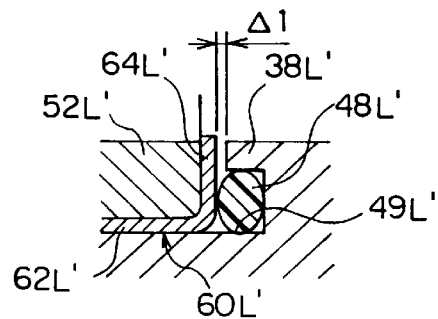
FIG. 15B is an enlarged view of the portion A of FIG. 15A.
Figure 15C:
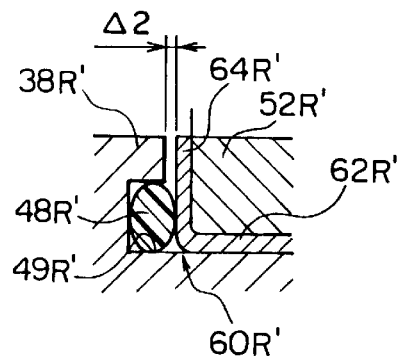
FIG. 15C is an enlarged view of the portion B of FIG. 15A.

FIG. 14 is a partial cross-sectional view of an electric power assisting steering apparatus 100' according to an eleventh embodiment of the present invention, and FIG. 15 is an enlarged view of a principal portion of the electric power assisting steering apparatus 100'.

Referring to FIG. 14, the electric power assisting steering apparatus 100' comprises a tube 90' which is extended horizontally, a housing 10' disposed at the left end of the tube, and an electric motor 30'. The tube 90' is fixed to a car body, which is not shown in the drawing, by a bracket 92'.

In the housing 10', an input shaft 12' which is connected to an unrepresented steering wheel is extended from right to left, and is connected to the right end (not shown) of an output shaft 14' which is connected to an unrepresented steering mechanism via a unrepresented torsion bar in the tube 90'. The center of the output shaft 14' is supported by two bearings 16' to allow free rotation. The outer races of the bearings 16' are supported by a bearing holder 18', and the bearing holder 18' is fixed to the housing 10' by use of a bolt 20'. It should be noted that a lock nut 22' is threadably mounted on the output shaft 14' in order to press down the inner races of the bearings 16'.

The electric motor 30' is disposed in a direction intersecting the housing 10' (the direction perpendicular to the sheet surface of FIG. 14). This electric motor 30' is connected to an unrepresented CPU, and this CPU is used to receive an output of a torque sensor (not shown) or information on a car speed, etc., so as to produce a proper auxiliary or assisting torque.

A worm wheel 24' made of resin is fixed near the right end (not shown) of the output shaft 14' to be incapable of relative rotation. A worm 40' is fixed to the rotating shaft 32' of the electric motor 30' to be incapable of relative rotation, and is meshed with the worm wheel 24'.

FIG. 15A is a view of the electric power assisting steering apparatus 100' shown in FIG. 14, taken along the line 15A—15A, and FIG. 15B is an enlarged view of the portion A of FIG. 15A. Referring to FIG. 15B, a serrated portion 34' is formed at the left end of the rotating shaft 32' of driven by the electric motor 30' to which a driving electric power is supplied through a power supply line 41'. portions 36L', 36R' and flange portions 38L', 38R' are respectively formed near the left end and the right end of the rotating shaft 32', and the worm 40' is formed between the two flange portions. The serrated portion 34' is engaged with a serrated hole of a rotor (the output shaft) 42', and the rotor 42' and the rotating shaft 32' are integrally rotated. Bearings 50L', 50R'are mounted on the supporting portions via bushes 60L', 60R' each having an L-shaped cross section which are respectively interposed between the inner races 52L', 52R' and the supporting portions 36L', 36R'.

A leftward movement of the left bearing 50L' is limited since a stop ring 46' mounted on the inner peripheral surface of the housing 10' is brought into contact with the left end surface of the outer race 54L'As shown in FIG. 15B, an O-ring 48L' made of rubber or resin is interposed between the flange portion 64L' of the bush 60L' and the flange portion 38L' of the rotating shaft 32' to serve as an elastic member. More specifically, a peripheral groove 49L' is formed at the root of the flange portion 38L', and the O-ring is fitted in this peripheral groove.

It should be noted that the C-rings 48L', 48R' and the bushes 60L', 60R' may be interposed between the bearings 50L', 50R' and the housing 10'.

Figure 16:
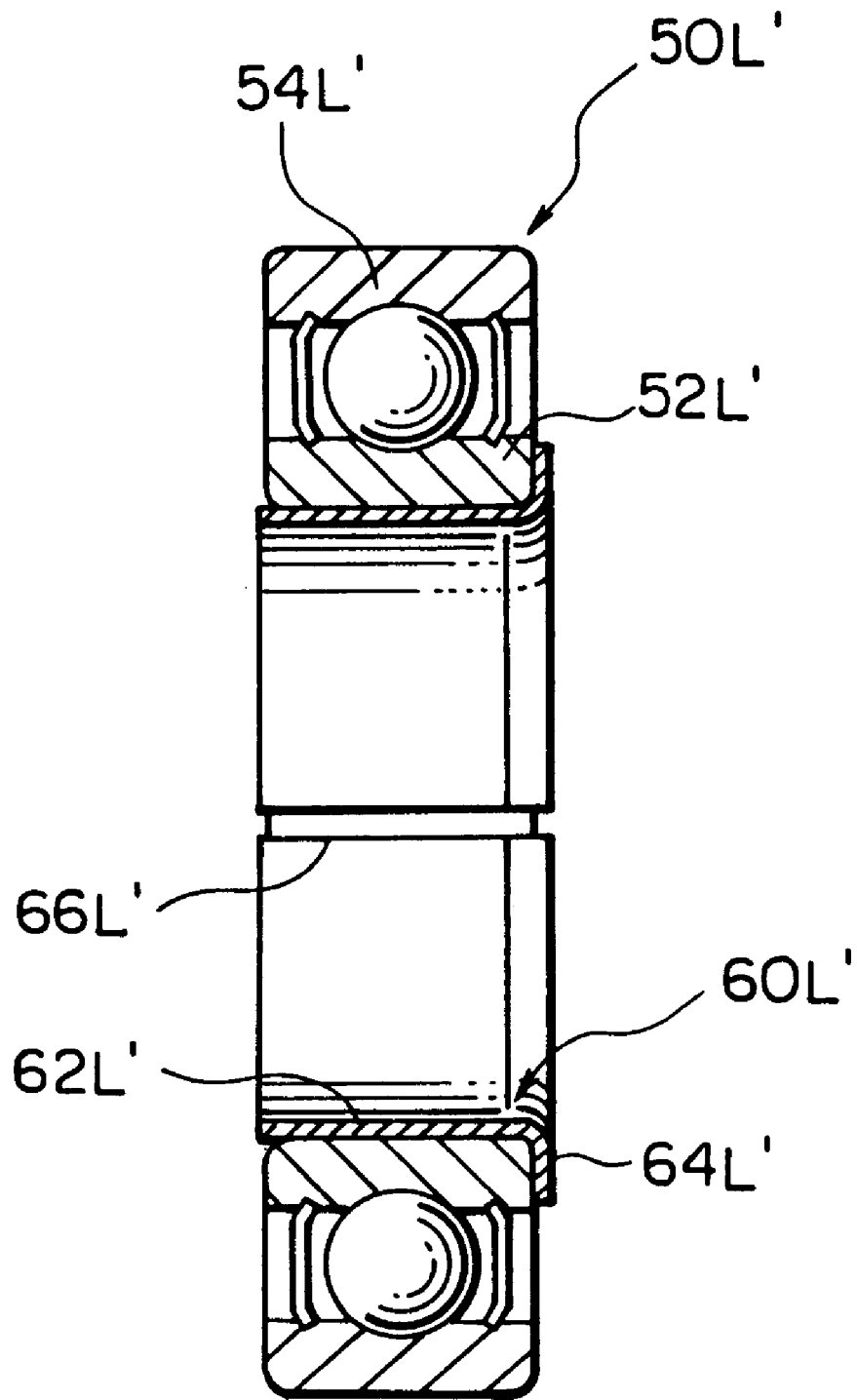
FIG. 16 is an enlarged view of a principal portion of FIG. 15A.

As shown in FIG. 15B, the left bush 60L' is comprised of a cylindrical mounting portion 622' and the flange portion 64L' which is extended outward from an end of the mounting portion 62L' in the radial direction, so as to have an L-shaped cross section (one-side flange type). The mounting portion 62L' has substantially the same width as that of the inner race 52L', while the flange portion 64L' has substantially the same height as the height (thickness) of the inner race 52L'. As shown in FIG. 16, a slit 66L' is formed on the bush 60L' over a predetermined length of the cylindrical portion thereof in the axial direction, so as to enhance the deforming capability. It should be noted that the bush 60L' is formed by coating Teflon on one surface (the surface contacting with the supporting portion 36L') of a steel plate, and is fitted on the position indicated in the drawing with pressure.

Such circumstances are substantially the same as those with respect to the right bearing 50R', so that corresponding members and elements are given the same numbers with R' instead of L', and detailed description thereof will be omitted.

It should be noted that a gap between the flange portion 64L' of the bush 60L' and the flange 38L' of the rotating shaft 32' is indicated by Δ1, and a gap between the flange portion 64R' and the flange 38R' by Δ2 (Δ1=Δ2).

Moreover, since the O-rings 48L', 48R' are provided as being flexed to some extent between the bearings 50L'50R' and the flange portions 38L', 38R', a predetermined pressure is given to the bearings 50L', 50R' in the axial direction, whereby the rotating shaft 32' is supported to have no backlash in the axial direction. In addition, when a normal auxiliary or assisting steering power is transmitted from the worm 40' to the worm wheel 24', an amount of flexion is set such that even if one of the O-rings 48L' is flexed and the rotating shaft is moved to the maximum in one direction, flexion of the other of the O-rings 48R' remains.

On the right side of the right bearing 50R', a pressing plate 70' which is contacted with the right end surface of the outer race 52R' is mounted and a nut 74' is threadably engaged with a male screw portion 72', so as strengthen the supporting condition of the right end of the rotating shaft 32' by the bearing 50R'. The above-mentioned gaps Δ1, Δ2 are adjusted by rotating the male screw portion 72' to press the bearing 50R' through the pressing plate 70'.

Next, an operation of the eleventh embodiment will be described below.

When the car is in a straight advance condition and no steering power is supplied to the input shaft 12' via the unrepresented steering wheel, the unrepresented torque sensor does not issue an output signal and, therefore, the electric motor 30' does not generate any auxiliary or assisting steering power.

If the driver handles the unrepresented steering wheel when the car is to make a turn at a curve, the torsion bar (not shown) is distorted according to the steering power so that a relative rotational movement is generated between the input shaft 12' and the output shaft 14'. The torque sensor outputs a signal to the CPU (not shown) in accordance with the direction and the amount of this relative rotational movement. Based on this signal, the electric motor 30' is controlled by the CPU to generate the auxiliary or assisting steering power. Such rotation of the electric motor 30' is decelerated by the worm gear mechanism to be transmitted to the output shaft 14'.

Incidentally, when the steering wheel is turned in one direction and, immediately after that, is turned in the reverse direction when the car is to be moved aside, or moved out of the way, the direction of the power transmission is rapidly reversed, and the tooth surface of the worm 30a and that of the worm wheel 13 which are usually separated away from each other to allow backlash are collided with each other. In addition, there may be also a case in which the tooth surfaces are collided with each other due to a vibration transmitted from the wheels in running. However, according to the present embodiment, after supporting the rotating shaft 32' by use of the bearings 50L', 50R' through the bushes 60L', 60R' to move in the axial direction, an impact generated among the tooth surfaces of the worm gear is eased by further flexing the O-rings 48L', 48R' to move the rotating shaft 32' in the axial direction, whereby the beating sound can be reduced.

On the other hand, when only the elastic bodies 48L'48R' are interposed between the bearings 50L'. 50R' and the bushes 60L', 60R' are not provided, it is difficult to say that the rotating shaft 32' can be easily moved in the axial direction.

The twelfth embodiment of the present invention will be described below.

A difference between the twelfth embodiment shown in FIG. 17A and the eleventh embodiment mentioned above lies in the arrangement of the elastic bodies. More specifically, elastic bodies 110L' 110R' are interposed between a bearing 160L' and a flange 138L' of a rotating shaft 132' and between a bearing 150R' and a flange 138R'. It should be noted that the both elastic members 110L', 110R' are identical to each other, but only disposed in symmetric positions relative to the worm 140', so that only the left elastic member 110L' will be fully described with reference to FIG. 17B. The elastic member 110L'comprises a cylindrical member 112L' which is fitted on the rotating shaft 132', a flange portion 114L' which is brought into contact with a flange portion 164' of a bush 160L', and a disc portion 116L'. The flange portion 114L'and the disc member 116L' are connected to each other by an elastic portion 118L'. A part of the elastic portion 118L' is extended thinly along the inner surface of the cylindrical member 112L' in the axial direction, so as to form a thin portion 119L' which is thin in the axial direction at the end portion of the cylindrical member.

The elastic member 110L' in its assembled state brings the disc portion 116L' into contact with the flange 138L' of the rotating shaft 132', and the flange portion 114L' with an inner race 152L' of a bearing 150L' via a flange portion 164L' of a bush 160R', so that the elastic portion 118L', i.e., the bearing 150L' may be given a predetermined preload by pressing the bearing 150L' and the flange 138L' toward each other. In the assembled state, the flange 138L' and the thin portion 119L' are separated away from each other only by a distance L3.

Figure 18:
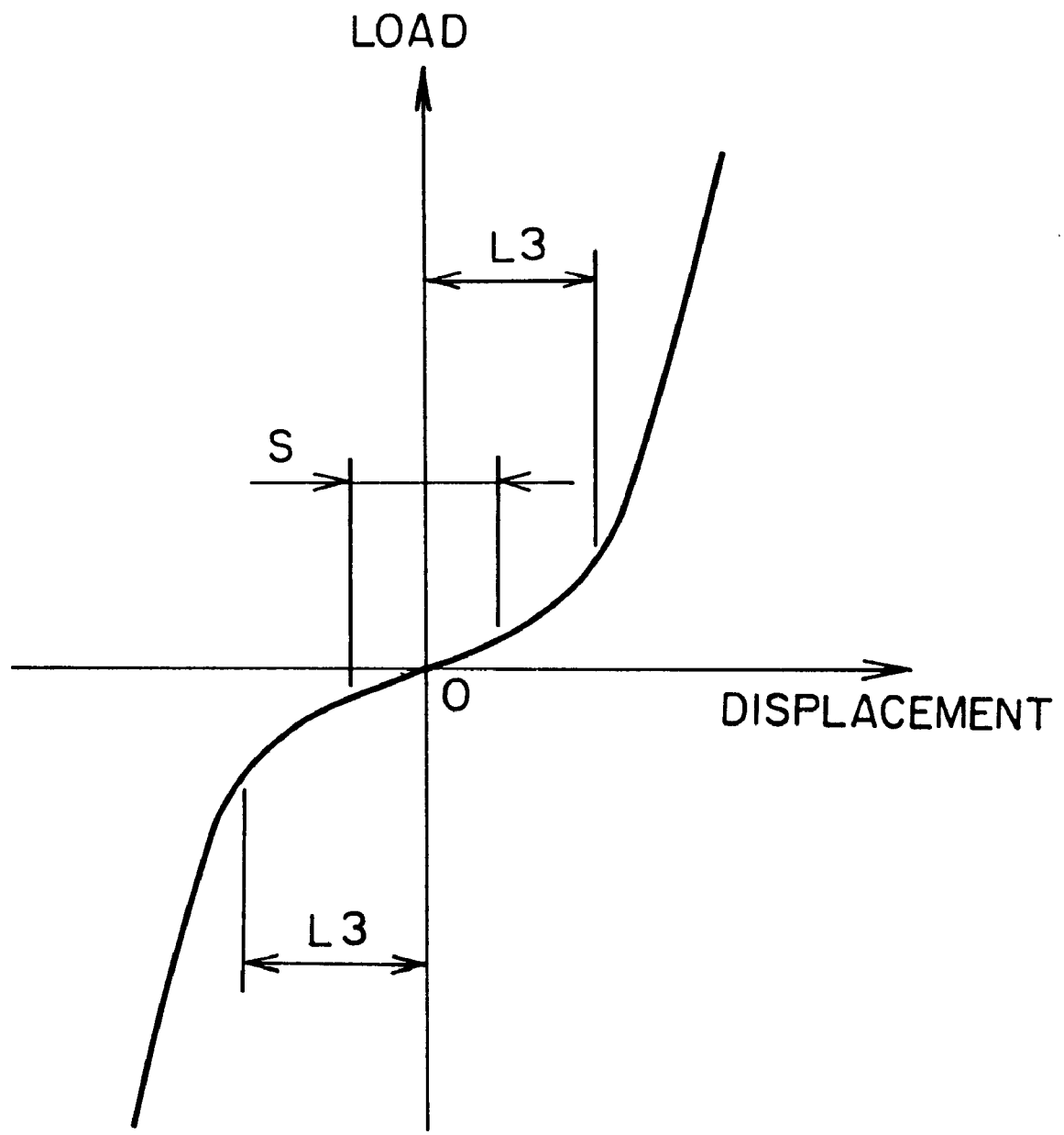
FIG. 18 is a graph for explaining the effects of the second embodiment.

FIG. 18 is a characteristic view showing an amount of displacement of the rotating shaft 132' when the elastic members 110L', 110R' are incorporated in the rotating shaft 132' to give a load to the bearings 150L', 150R' in the axial direction. When the amount of displacement and the load are negative, it is indicated that the rotating shaft 132' is given a leftward force to be displaced leftward. When the amount of displacement and the load are positive, it is indicated that the rotating shaft 132' is given a rightward force to be displaced rightward. For convenience of the description, the rotating shaft 1321 is to be displaced leftward.

As clearly seen from FIG. 18, when the amount of the displacement exceeds the value L3, the load rises extremely. The reason for this is, though only an elastic portion 118L' of the elastic member 110L'is elastically deformed until the amount of the displacement reaches the value L3, the thin portion 119L' is brought into contact with the flange 138L' when the amount of the displacement exceeds the value L3, whereby the load for a unit amount of displacement rapidly increases.

In the present embodiment, since a load supplied to the rotating shaft 132' due to a vibration or the like from the unrepresented wheels is comparatively small, the rotating shaft 132' is only displaced in the axial direction within a range of the area S shown in FIG. 18. Consequently, the thin portion 119L' of the elastic member 110L' and the corresponding portion of elastic member 110R' are not brought into contact with the flanges 138L', 138R' so that the rigidity of the elastic members 110L', 110R' is small and the effect of reducing the gear beating sound is large.

On the other hand, when the load supplied from the motor 130' is large and the amount of the displacement of the rotating shaft 132' exceeds the value L3, the thin portion 119L' is brought into contact with the flange 138L', or the corresponding portion of elastic member 110R' is brought into contact with the flange 138R', so as to suppress further displacement of the rotating shaft 132'. Consequently, it is possible to suppress an amount of friction between the rotating shaft 132' and the bearings 150L', 150R or friction of a spline portion 124' connected to the motor. It is also possible to prevent a worm 140' from escaping in the axial direction so as to enhance the performance of control response. An electric power supply line 141'supplies the power to the motor 130'.

Figure 19A:
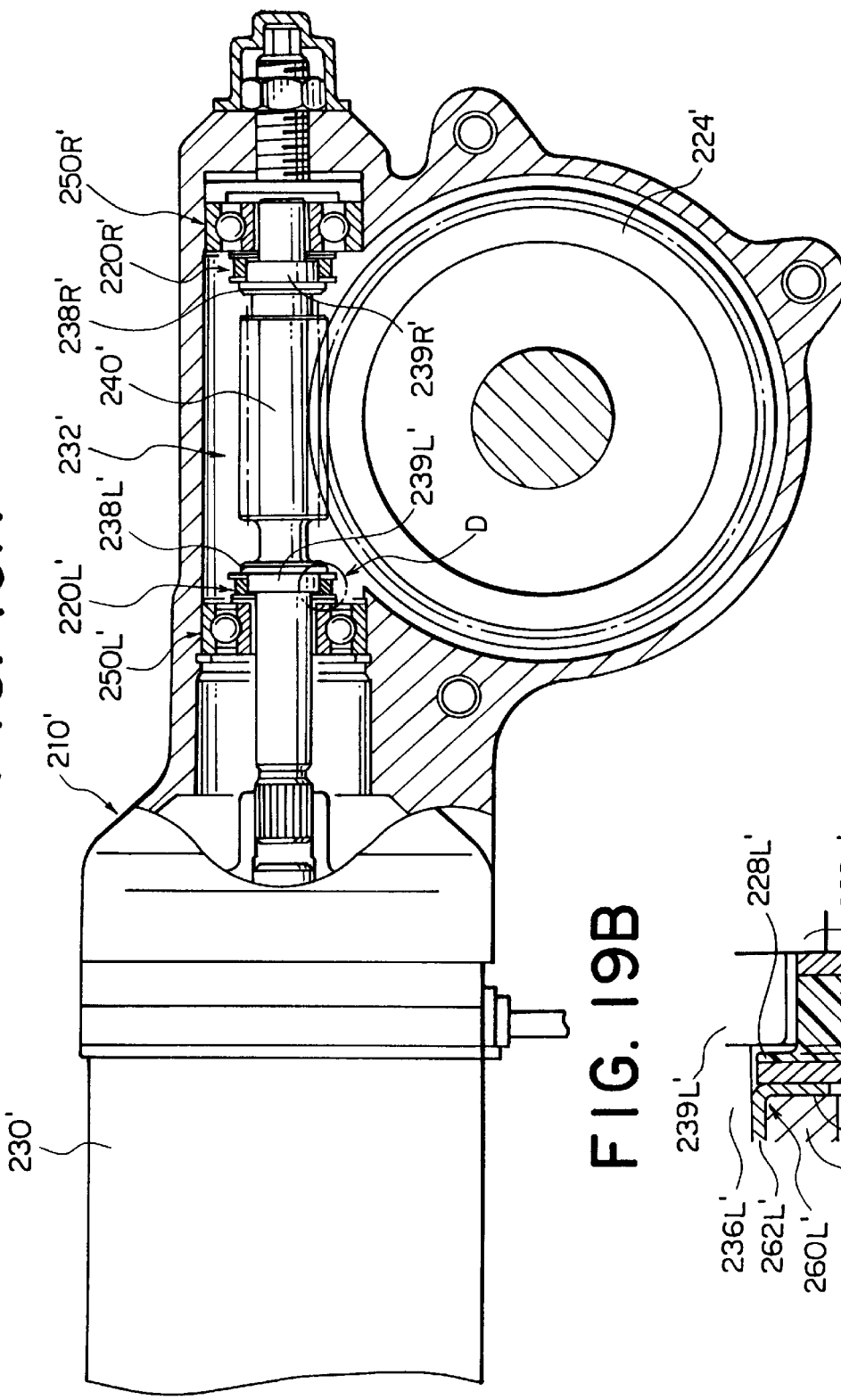
FIG. 19A is a front view (partial broken) showing a thirteenth embodiment of the present invention.

FIG. 19A is a view showing a thirteenth embodiment of the present invention. The thirteenth embodiment is different from the twelfth embodiment in the arrangements of the rotating shaft and the elastic members. As shown in FIG. 19A, on a rotating shaft 232', large diameter portions 239L', 239R'are formed to be adjacent to flange portions 238L', 238R'.

Figure 19B:
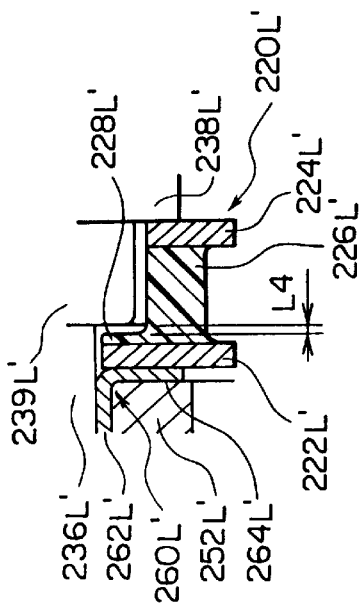
FIG. 19B is an enlarged view of the portion D of FIG. 19A.

As shown in FIG. 19B, a left elastic member 220L' which is interposed between a bearing 250L' and a flange portion 238L' of rotating shaft 232' comprises a small-diameter hole disc portion 222L' disposed on a supporting portion 236L' of the rotating shaft, and a large-diameter hole disc portion 224L' disposed on the outer periphery of a large diameter portion 239L'. The two disc portions are connected to each other by an elastic portion 226L'. A part of the elastic portion 226L' is extended thinly along the side surface of the small-diameter hole disc portion 222L' in the axial direction, so as to form a thin portion 228L' between the small-diameter hole disc portion 222L' and the large diameter portion 224L'.

The elastic member 220L' in its assembled state brings the large-diameter hole disc portion 224L' into contact with the flange 238L' of the rotating shaft 232'and the small-diameter hole disc portion 222L' with an inner race 252L' of bearing 250L' via the flange portion 264L' of a bush 260L', so as to give the elastic portion 226L' a predetermined pressure. The flange and the thin portion are separated away from each other only by a distance L4.

In the same manner as in the twelfth embodiment described above, it is arranged such that only the elastic portion 226L' of the elastic member 220L' is elastically deformed until the amount of the displacement of the rotating shaft 232' reaches the value L4, but the thin portion 228L' is brought into contact with the large diameter portion 239L' when the amount of the displacement exceeds the value L4, whereby the load for a unit amount of displacement rapidly increases.

According to the present embodiment, in addition to the effect of the twelfth embodiment described above, as shown in FIG. 19B, the hole of the small-diameter hole disc portion 222L' of the elastic member 220L' has the smaller diameter than the outer diameter of the large diameter portion 239L', so that it is impossible to incorporate the small-diameter hole disc portion into the outer periphery of the large diameter portion 239L'. Consequently, according to such arrangement, it is possible to prevent erroneous assembly in which the direction of incorporation of the elastic member 220L' is erroneous so as to provide the elastic member 220L' on the outer periphery of the rotating shaft 232'.

Next, the thirteenth embodiment of the present invention will be described, in which improvement is brought about on the shape of the bush having the L-shaped cross section.

More specifically, as described with reference to FIG. 19B, the bushes 260L', 260R' each having an L-shaped cross section are mounted on the bearings 250L', 250R' by fitting the cylindrical portions 262L', 262R' of the bushes in the inner peripheral surfaces of the inner races 252L', 252R' with pressure. However, if the thickness of the bushes 260L', 260R' is made larger in order to secure a pressurizing load, the dimensions of the bearings 250L', 250R' in the radial direction and the axial direction become larger to that extent. As a result, with an increase of the cost of manufacturing the bearings, a space for mounting the bearings is required to be larger to that extent.

However, if the thickness of the bushes 260L', 260R' each having an L-shaped cross section is made small, a force is given to the flange portions 264L', 264R' of the bushes when the rotating shaft 232' is moved in the axial direction so that the flange portions 264L', 264R' may be deformed or broken. Also, the rigidity of the bushes 260L', 260R' in the circumferential direction on the side provided with the flange portion is different from that on the side with no flange portion, so that the inner diameter dimensions of the bushes are not stabilized if only the bushes are mounted on the bearings 250L', 250R I Thus, it is necessary to select the shaft diameter of the worm 240 to be assembled.

Moreover, when a slit 66L' is formed in parallel to the axial direction as in FIG. 16, if the width of the slit 66L' is large, a space may be produced in the slit portion to generate a beating sound between the worm 40' and the worm wheel 24' in some cases even if the gap between the bush 60L' and the rotating shaft 32' is set to be small.

Taking the above circumstances into consideration, in the following fourteenth embodiment of the invention, an arrangement is such that each of the bushes is formed to have a U-shaped cross section (both-side flange type) and the slit has a predetermined angle relative to the axial direction of the bush.

Figure 20:
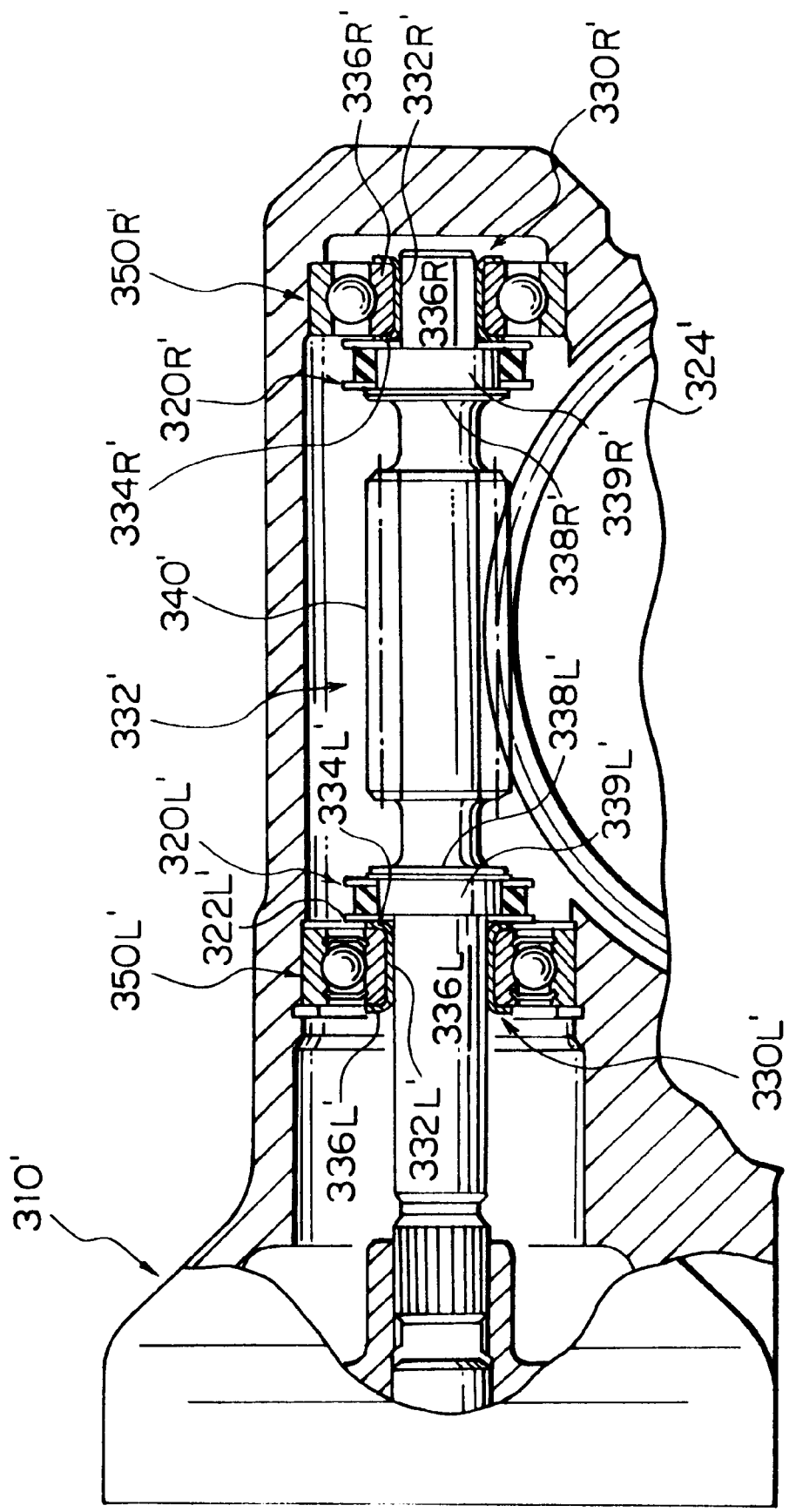
FIG. 20 is a front view (partial broken) showing a fourteenth embodiment of the present invention.
Figure 21:
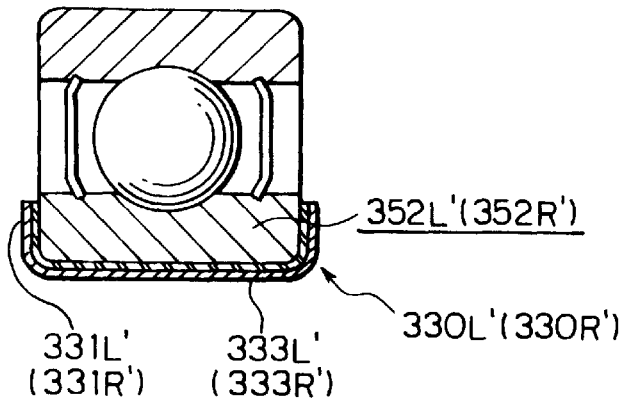
FIG. 21 is an enlarged view of a principal portion of FIG. 20.

Specifically, as shown in FIGS. 20 and 21, bushes 330L', 330R' are formed by coating Teflon layers 333L', 333R' on the entire surfaces of the sides of inner races 352L', 352R' on base plates 331L', 331R' which are made of steel. The bushes 330L', 330R' respectively comprise cylindrical portions 332L', 332R' which are positioned between supporting portions 336L, 336R' of a rotating shaft 332' and inner races 352L', 352R' of bearings 350L', 350R', and flange portions 334L', 334R'; 336L', 336R'which are extended outward in the radial direction from both ends thereof. The heights of the outer flange portions 336L', 336R' and the inner flange portions 334L', 334R' are substantially the same as the height of inner races 352L', 352R', and the inner flange portions 334L', 334R' are interposed between small-diameter hole disc portions 322L', 322R' of elastic members 320L', 320R' and the inner races 352L', 352R'.

Figure 22A:
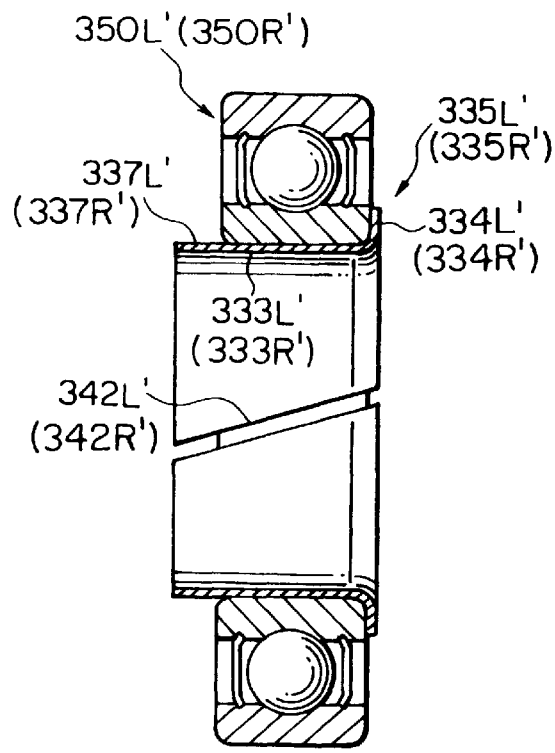
FIG. 22A is an explanatory view for explaining a process of preparing a bush used in the fourteenth embodiment of the present invention.
Figure 22B:
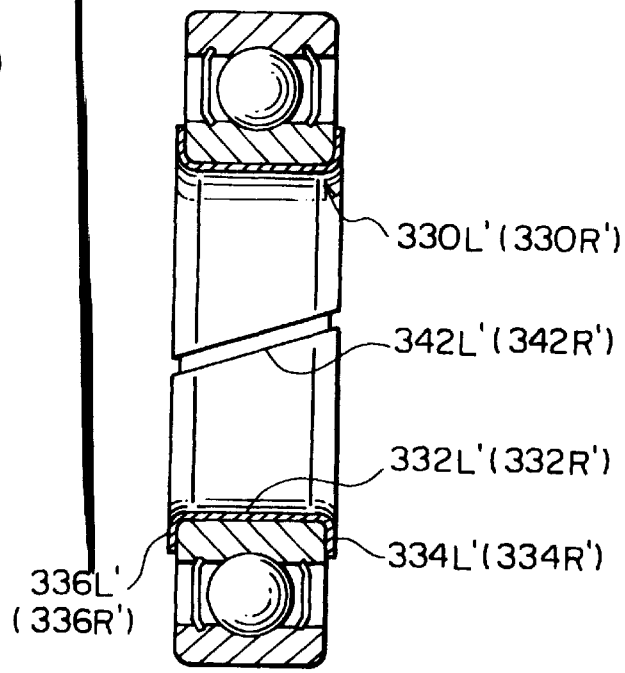
FIG. 22B is an explanatory view for explaining a process of preparing a bush used in the fourteenth embodiment of the present invention.

The bushes 330L', 330R' are formed in the following manner. As shown in FIG. 22A, a plate material (335R') with an L-shaped cross section which consists of a flange-like first portion 334L' (334R') and a cylindrical second portion (333R') is prepared, the inner race 352L' (352E') of the bearing 350L' (350R') is set on the outer peripheral surface of the plate material, and then, as shown in FIG. 22B, the front end portion 337L' (337R') of the second portion 333L' (333R') is bent in the same direction as and in parallel to the first portion 331L' 334L'. It should be noted that the slit 342L' (342R') is formed so as to be inclined relative to the axial direction of the bush 330L' (330R') (to make a predetermined angle).

According to this embodiment, the following advantageous arrangements are added to the embodiment shown in FIG. 19A. That is, the flange portions 334L', 334R'; 336L', 334R' are formed in the both end portions of bushes 330L', 330R' to balance the rigidity of the end portions, so that a taper of the cylindrical portions 332L', 332R' (uneven thickness) can be prevented. Moreover, the flange portions 334L', 334R'; 336L', 336R'on both sides are brought into contact with the end surfaces of the inner races 352', 352R', so that it is possible to prevent the bushes 330L ', 330R' from deviating from the mounted positions or the flange portions from being deformed or broken even when the rotating shaft 3321 is moved in either right or left direction. In addition, since slits 342L', 342R' are formed in oblique directions, backlash between the bushes 330L', 330R' and the rotating shaft 332' can be prevented so that a proper space control can be conducted easily.

It should be noted that a device for facilitating a movement of the rotating shaft in the axial direction may be provided between the worm and the worm wheel, instead of the bushes of the fourteenth embodiment described above. For example, the bushes 330L', 330R' in FIG. 20 may be removed and, instead, a metal or synthetic resin having a small friction factor may be coated on the tooth surfaces of the worm 340'. In this arrangement, in addition to that the bushes 330L', 330R' are no longer required, the outer diameter dimension of the worm 340' is stabilized since it is easy to control the thickness of the coating, so that a proper axial space can be set between the worm 340' and the worm wheel 324'. As a result, rust due to a contact between the worm 340' and the worm wheel 324' can be prevented.

The present invention can, in keeping with its basic principles and scope, be modified in others ways in improved within a scope of the gist of the invention, in addition to those describe above. For example, the first and second gears may be gears of another kind such as spur gears and the like.

As described above, according to the eleventh to fourteenth embodiments of the present invention, when the driving power is decelerated to be transmitted between the first gear which is mounted on the rotating shaft of the motor (supported by the bearings relative to the housing) and the second gear which is mounted on the output shaft connected to the steering apparatus, the elastic bodies are interposed between the bearings and the rotating shaft or the housing and the bushes are interposed between the bearings and the rotating shaft or the housing.

As a result, when the tooth surface of the first gear and that of the second gear are brought into contact with each other, the rotating shaft can be smoothly moved in the axial direction due to the elastic deformation of the elastic bodies and the sliding movement of the bushes, whereby the collision between the tooth surfaces can be eased and generation of the beating sound of the tooth surfaces can be prevented.

What is claimed is:

1. An electric power assisted steering apparatus, comprising:

a housing;

a motor mounted on said housing to generate auxiliary steering power in a rotary shaft extending from said motor;

an output shaft to transmit the steering power to steered wheels;

a bearing supporting said rotary shaft to be freely rotatable; and a gear mechanism having a first gear connected to said rotary shaft and a second gear connected to said output shaft to mesh with said first gear, to transmit the auxiliary steering power of said motor to said output shaft, wherein an elastic resin damper body having a vibration attenuating property is fitted under pressure between said bearing and at least one of said rotary shaft and said housing, such that when a tooth surface of said first gear and that of said second gear are brought into contact with each other, said rotary shaft can move in at least one of an axial direction and a radial direction relative to said housing by deforming said elastic resin damper body, thereby reducing rattling noise.

2. An electric power assisted steering apparatus according to claim 1, wherein said first gear includes a worm and said second gear includes a worm wheel.

3. An electric power assisted steering apparatus, comprising:

a housing;

a motor mounted on said housing to generate an auxiliary steering power in a rotary shaft extending from said motor;

a bearing supporting said rotary shaft to be freely rotatable;

an output shaft to transmit the steering power to steered wheels; and a gear mechanism having a first gear connected to said rotary shaft and a second gear connected to said output shaft to mesh with said first gear, to transmit the auxiliary steering power of said motor to said output shaft, wherein an elastic resin damper body having a vibration attenuating property is interposed between said rotary shaft or said housing and said bearing, a bush is fitted in a portion of said bearing to slide and move with said rotary shaft or said housing, such that when a tooth surface of the first gear and that of the second gear are brought into contact with each other, said rotary shaft can move in an axial direction relative to said housing via said bush by deforming said elastic body, thereby reducing rattling noise.

4. An electric power assisted steering apparatus according to claim 3, wherein said first gear includes a worm and said second gear includes a worm gear.

5. An electric power assisted steering apparatus, comprising:

a housing;

a motor mounted on said housing to generate an auxiliary steering power in a rotary shaft extending from said motor;

an output shaft to transmit the steering power to steered wheels;

a bearing supporting said rotary shaft to be freely rotatable; and a gear mechanism having a first gear connected to said rotary shaft and a second gear connected to said output shaft to mesh with said first gear, to transmit the auxiliary steering power of said motor to said output shaft, wherein a damper body including an elastic resin member having a vibration attenuating property is fitted between said bearing and at least one of said rotary shaft and said housing, such that said rotary shaft is supported through the damper body to said housing and is movable by deforming said elastic resin member so as to reduce rattling noise when a tooth surface of the first gear and that of the second gear are brought into contact with each other.

6. An electric power assisting steering apparatus according to claim 5, wherein a said damper body is press-fitted between said bearing and at least one of said rotary shaft and said housing.

7. An electric power assisted steering apparatus according to claim 6, wherein said elastic resin member includes an O-ring.

8. An electric power assisted steering apparatus according to claim 6, wherein said damper body includes a rigid bush and said elastic resin member includes an elastic resin layer deposited on said bush.

9. An electric power assisted steering apparatus according to claim 5, wherein said damper body includes a pair of disc portions coupled by said elastic resin member, and said damper body is disposed between a race of said bearing and a flange of said rotary shaft.

10. An electric power assisted steering apparatus according to claim 9, wherein said race is an inner race of said bearing.

11. An electric power assisted steering apparatus according to claim 9, wherein one of said disc portions that is closer to said bearing is joined to a member mounted to said rotary shaft with a predetermined axial clearance to said flange.

12. An electric power assisted steering apparatus according to claim 11, wherein said member mounted to said rotary shaft is a cylindrical member in which said rotary shaft is received.

13. An electric power assisted steering apparatus according to claim 11, wherein a portion of said elastic resin member is interposed between said one disc portion and said flange.

14. An electric power assited steering apparatus according to claim 11, wherein said race is an inner race of said bearing.

15. An electric power assisted steering apparatus according to claim 9, wherein one of said disc portions closer to said bearing is disposed with a predetermined axial clearance to a second flange of said shaft located between said bearing and the first-mentioned flange.

16. An electric power assisted steering apparatus according to claim 15, wherein a portion of said elastic resin member is interposed between said one disc portion and said second flange.

17. An electric power assisted steering apparatus according to claim 15, wherein said race is an inner race of said bearing.

* * * * *